(12) United States Patent
Kobayashi

(10) Patent No.: US 10,071,394 B2
(45) Date of Patent: Sep. 11, 2018

(54) APPLICATION PRODUCT AND APPLICATION SYSTEM

(75) Inventor: Shogo Kobayashi, Osaka (JP)

(73) Assignee: Kokuyo Co., Ltd., Osaka (JP)

( * ) Notice: Subject to any disclaimer, the term of this patent is extended or adjusted under 35 U.S.C. 154(b) by 871 days.

(21) Appl. No.: 14/129,900

(22) PCT Filed: Jun. 5, 2012

(86) PCT No.: PCT/JP2012/064457
§ 371 (c)(1),
(2), (4) Date: Dec. 27, 2013

(87) PCT Pub. No.: WO2013/001992
PCT Pub. Date: Jan. 3, 2013

(65) Prior Publication Data
US 2014/0140751 A1 May 22, 2014

(30) Foreign Application Priority Data
Jun. 28, 2011 (JP) ................. 2011-142557

(51) Int. Cl.
*B43M 11/06* (2006.01)
*B32B 1/02* (2006.01)
(Continued)

(52) U.S. Cl.
CPC ............. *B05C 17/00* (2013.01); *B32B 1/02* (2013.01); *B43M 11/06* (2013.01);
(Continued)

(58) Field of Classification Search
CPC ... B43M 11/06; C09J 9/00; C09J 9/005; C09J 11/06; B32B 27/08; B32B 27/10;
(Continued)

(56) References Cited

U.S. PATENT DOCUMENTS 5,749,298 A * 5/1998 Castelli .................. B41F 30/04
101/376
6,268,055 B1 * 7/2001 Walters ................ C09D 163/00
252/586
(Continued)

FOREIGN PATENT DOCUMENTS

EP  1 637 570 A1  3/2006
EP  1637570 A1   3/2006
(Continued)

OTHER PUBLICATIONS

Extended European Search Report for Application No. 12804080.5, dated Jan. 30, 2015, 9 pgs.
(Continued)

*Primary Examiner* — Walter Aughenbaugh
(74) *Attorney, Agent, or Firm* — Hogan Lovells US LLP

(57) ABSTRACT

Transferring tool (1), which is an application product according to the present, is characterized by comprising: agglutinant (55) which is a material for application, containing a photochromic compound that exhibits color when an ultraviolet light which is a certain wavelength light having a certain wavelength is irradiated thereon and becomes colorless when a visible light is irradiated thereon, that enters a state of exhibiting color when the certain wavelength light is irradiated thereon and enters a decolorized state when a visible light is irradiated thereon; case (2) which is a container in which said agglutinant (55) is accommodated; and irradiation unit (34) that is attached to case (2) and enables agglutinant (55) to be in a state of exhibiting color by irradiating an ultraviolet light towards passage region (X) that agglutinant (55) passes through within case (2) upon being applied onto a subject.

16 Claims, 16 Drawing Sheets

(51) Int. Cl.
*B05C 17/00* (2006.01)
*C09J 9/00* (2006.01)
*B65H 37/00* (2006.01)
*C09J 11/06* (2006.01)
*C08K 5/00* (2006.01)

(52) U.S. Cl.
CPC .............. *B65H 37/007* (2013.01); *C09J 9/00* (2013.01); *C09J 9/005* (2013.01); *C09J 11/06* (2013.01); *C08K 5/0041* (2013.01); *Y10T 428/1352* (2015.01)

(58) Field of Classification Search
CPC ........... B32B 27/18; B32B 27/30; B32B 1/02; Y10T 428/1352
See application file for complete search history.

(56) References Cited

U.S. PATENT DOCUMENTS

| | | | |
|---|---|---|---|
| 6,543,511 B2 * | 4/2003 | Niermann | B65H 35/0026 156/527 |
| 7,089,420 B1 * | 8/2006 | Durst | G09C 5/00 283/72 |
| 2004/0135097 A1 * | 7/2004 | Shibahashi | A63H 33/22 250/474.1 |
| 2006/0053975 A1 * | 3/2006 | Shibahashi | B43K 5/02 81/9.2 |
| 2007/0137521 A1 | 6/2007 | Kugel et al. | |
| 2009/0097898 A1 | 4/2009 | Iftime et al. | |
| 2011/0026984 A1 * | 2/2011 | Tominaga | G03G 15/1685 399/313 |

FOREIGN PATENT DOCUMENTS

| | | |
|---|---|---|
| JP | 04280206 | 10/1992 |
| JP | 04360886 | 12/1992 |
| JP | 0733887 | 6/1995 |
| JP | 08120227 | 5/1996 |
| JP | 09-227845 | 9/1997 |
| JP | 2001342430 | 12/2001 |
| JP | 2003292932 | 10/2003 |
| JP | 2005187176 | 7/2005 |
| JP | 2005225006 | 8/2005 |
| WO | 2005019281 A1 | 3/2005 |

OTHER PUBLICATIONS

Japanese Office Action for Japanese application No. 2011-142557, dated Oct. 30, 2014, 3 pages.
Chinese Office Action for Chinese application No. 201280032051.1, dated Sep. 1, 2014, 8 pages.
International Search Report PCT/JP2012/064457 dated Aug. 1, 2012, 2 pgs.
EP Office Action application No. 12804080.5, dated May 29, 2017, pp. 5.

* cited by examiner

FIG.13

| | Agglutinant Volume | Diarylethene Concentration | Type of Solvent | Solvent Volume | Diarylethene + Solvent Stirring Method | Diarylethene + Solvent Stirring Time | Method of Stirring into Agglutinant | Time of Stirring into Agglutinant | Heat-Drying Temperature | Heat-Drying Time | Glue Thickness | Degree of Color (upon transfer on paper) | Decolorizing Time (minutes) |
|---|---|---|---|---|---|---|---|---|---|---|---|---|---|
| Practical Example 1-1 | 100 g | 0.005% | | | | | | | | | | Grade 6 | 0 |
| Practical Example 1-2 | 50 g | 0.01% | | | | | | | | | | Grade 5.5 | 0 |
| Practical Example 1-3 | 10 g | 0.05% | | | | | | | | | | Grade 5 | 0 |
| Practical Example 1-4 | 3 g | 0.1% | | | | | | | | | | Grade 4 | 5 |
| Practical Example 1-5 | | 0.2% | | | | | | | | | | Grade 3.5 | 7 |
| Practical Example 1-6 | | 0.3% | Acetone | 0.1 ml | Manually stirred with a Scoopula | 30 sec | Mixer | 1 min | | | | Grade 3 | 8 |
| Practical Example 1-7 | | 0.5% | | | | | | | | | | Grade 3 | 11 |
| Practical Example 1-8 | | 1.0% | | | | | | | | | | Grade 2.5 | 12.5 |
| Practical Example 1-9 | | 3.0% | | | | | | | | | | Grade 1.5 | 19 |
| Practical Example 1-10 | | 5.0% | | 0.4 ml | | | | | | | | Grade 1 | 31.5 |
| Practical Example 1-11 | | 10.0% | | 0.8 ml | | | | | | | | Grade 1 | 39 |
| Practical Example 1-12 | | | Toluene | 0.1 ml | | 30 sec | | | | | | Grade 3 | |
| Practical Example 1-13 | | | | | | 5 min | | | | | | Grade 3 | |
| Practical Example 1-14 | | | Ethanol | | | 5 min | | | | | | Grade 3 | |
| Practical Example 1-15 | | | | | | Half-Day | | | | | | Grade 3 | |
| Practical Example 1-16 | 1 g | | | None | | — | Magnetic Stirrer | 3 h | | | 20-25 μm | Grade 3 | |
| Practical Example 1-17 | | | | | | — | | Half-Day | | | | Grade 3 | |
| Practical Example 1-18 | | 0.5% | | 0.2 ml | | | | 1 min | | | | Grade 3 | |
| Practical Example 1-19 | | | | 0.5 ml | | | | 5 min | | | | Grade 3 | |
| Practical Example 1-20 | | | | 0.1 ml | | | | 10 min | | | | Grade 3 | |
| Practical Example 1-21 | | | Acetone | 0.5 ml | Manually stirred with a Scoopula | 30 sec | Mixer | 5 min | | | | Grade 3 | |
| Practical Example 1-22 | | | | | | | | 10 min | | | | Grade 3 | |
| Practical Example 1-23 | | | | | | | | | 150°C | 10 min | | Grade 3 | |
| Practical Example 1-24 | | | | | | | | | 100°C | 10 min | | Grade 3 | |
| Practical Example 1-25 | | | | | | | | | 200°C | 2 min | | Grade 3 | |
| Practical Example 1-26 | | | | 0.1 ml | | | | 1 min | | | 35 μm | Grade 3 | |
| Practical Example 1-27 | | | | | | | | | 150°C | 2 min | 35 μm | Grade 2 | |
| Practical Example 1-28 | | | | | | | | | | | 25 μm | Grade 3 | |
| Practical Example 1-29 | | | | | | | | | | | 10 μm | Grade 4 | |

- Color confirmation: Determined upon being transferred onto copying paper (manufactured by KOKUYO S&T Co., Ltd., product number: KB-39N)
- Diarylethene: 1,2–Bis(2-methylbenzo(b)thiophen–3–yl)hexafluorocyclopentene used
- Subjects were sufficiently irradiated with a wavelength of 365 nm using a UV lamp (AS ONE Handy UV Lamp SLUV-4 254/365nm 9.0W 0.15A FL4Wx1), and then studied to determine the degree of color.

Grade 1: Sufficiently rather bold color    Grade 2: Sufficient color    Grade 3: Color can be visibly interpreted
    Grade 4: Color is slightly weak    Grade 5: Color is weak    Grade 6: Almost no color

- Decolorizing Confirmation: Subjects were transferred onto copying paper (manufactured by KOKUYO S&T Co., Ltd., product number: KB-39N), further laminated on top with an identical copying paper, left on a desk (under a fluorescent light) within a certain office, and then studied for color from above while being kept on the desk to confirm the time until the color completely disappeared.

FIG.14

| | Cyanoacrylate | Cyanoacrylate Volume | Diarylethene Concentration (%) | Stirring Method | Stirred Time | Irradiated Container | Irradiated Liquid Weight | Distance of UV Light from Liquid Surface (cm) | Irradiated Time | Degree of Color |
|---|---|---|---|---|---|---|---|---|---|---|
| Practical Example 2-1 | Cyanoacrylate monomer | 2 g | 0.5% | Manually stirred with a Scoopula | 5 min * Visibly looks completely dissolved | PP Cup (5 ml) | 2 g | 15 mm | 5 min | Grade 2 |
| Practical Example 2-2 | Aron Alpha for Professionals (high-speed) | | | | | | | | | Grade 2 |
| Practical Example 2-3 | Aron Alpha for Professionals (impact-resistant) | | | | | | | | | Grade 2 |
| Practical Example 2-4 | Aron Alpha Jellified | | | | | | | | | Grade 2 |
| Practical Example 2-5 | | 20 g | 0.005% | | | | | | | Grade 5.5 |
| Practical Example 2-6 | | 10 g | 0.01% | | | | | | | Grade 5.5 |
| Practical Example 2-7 | | | 0.05% | | | | | | | Grade 5 |
| Practical Example 2-8 | | | 0.1% | | | | | | | Grade 4 |
| Practical Example 2-9 | | 5 g | 0.2% | | | | | | | Grade 3 |
| Practical Example 2-10 | | | 0.25% | | | | | | | Grade 3 |
| Practical Example 2-11 | | | 0.3% | | | | | | | Grade 3 |
| Practical Example 2-12 | | | 0.5% | | | | | | | Grade 2 |
| Practical Example 2-13 | | | 1.0% | | | | | | | Grade 2 |
| Practical Example 2-14 | Cyanoacrylate monomer | | 3.0% | | | | | | | Grade 1.5 |
| Practical Example 2-15 | | | 5.0% | | | | | | | Grade 1 |
| Practical Example 2-16 | | | 10.0% | | | | | | | Grade 1 |
| Practical Example 2-17 | | 2 g | 0.5% | Manually stirred with a Scoopula | 10 min | | | | | Grade 2 |
| Practical Example 2-18 | | | | Stirrer (500 rpm) | 5 min | | | | | Grade 2 |
| Practical Example 2-19 | | | | | 10 min | | | | | Grade 2 |
| Practical Example 2-20 | | | | Manually stirred with a Scoopula | 5 min | | | 30 mm | 10 min | Grade 2 |
| Practical Example 2-21 | | | | | | | | | 5 min | Grade 2.5 |

- Diarylethene: 1,2-Bis(2-methylbenzo(b)thiophen-3-yl)hexafluorocyclopentene used
- Subjects were sufficiently irradiated with a wavelength of 365 nm using a UV lamp (AS ONE Handy UV Lamp SLUV-4 254/365nm 9.0W 0.15A FL4Wx1), and then studied to determine the degree of color.

Grade 1: Sufficiently rather bold color  Grade 2: Sufficient color  Grade 3: Color can be visibly interpreted
Grade 4: Color is slightly weak  Grade 5: Color is weak  Grade 6: Almost no color

FIG.15

| | Agglutinant Volume | Diarylethene Concentration | Type of Ultraviolet Absorbent | Ultraviolet Absorbent Concentration | Type of Solvent | Solvent Volume | Diarylethene + Solvent Stirring Method | Diarylethene + Solvent Stirring Time | Method of Stirring into Agglutinant | Time of Stirring into Agglutinant | Heat-Drying Temperature | Heat-Drying Time | Agglutinant Thickness | Recoloring Confirmed Outdoors (grade) |
|---|---|---|---|---|---|---|---|---|---|---|---|---|---|---|
| Comparative Example 3-1 | 1 g | 1.0% | — | — | Acetone | 0.1 ml | Manually stirred with a Scoopula | 30 sec | Mixer | 1 min | 150°C | 2 min | 20–25 μm | Grade 4.5 |
| Practical Example 3-1 | | | SEESORB101 | 0.1% | | | | | | | | | | Grade 5 |
| Practical Example 3-2 | | | SEESORB101 | 0.5% | | | | | | | | | | Grade 5.5 |
| Practical Example 3-3 | | | SEESORB101 | 1.0% | | | | | | | | | | Grade 6 |
| Practical Example 3-4 | | | SEESORB102 | 0.1% | | | | | | | | | | Grade 4.5 |
| Practical Example 3-5 | | | SEESORB102 | 0.5% | | | | | | | | | | Grade 5.5 |
| Practical Example 3-6 | | | SEESORB102 | 1.0% | | | | | | | | | | Grade 6 |
| Practical Example 3-7 | | | SEESORB701 | 0.1% | | | | | | | | | | Grade 5.5 |
| Practical Example 3-8 | | | SEESORB701 | 0.5% | | | | | | | | | | Grade 6 |
| Practical Example 3-9 | | | SEESORB701 | 1.0% | | | | | | | | | | Grade 6 |

– Diarylethene: 1,2-Bis(2-methylbenzo(b)thiophen-3-yl)hexafluorocyclopentene used
– SEESORB 101: 2-Hydroxy-4-methoxybenzophenone
– SEESORB 102: 2-Hydroxy-4-n-octyloxybenzophenone
– SEESORB 701: 2-(2-Hydroxy-5-methylphenyl)benzotriazole
* SEESORB 101, SEESORB 102, and SEESORB 701 are names of products manufactured by SHIPRO KASEI KAISHA, LTD.
– Subjects sufficiently irradiated with a wavelength of 365 nm to exhibit color were completely decolorized (Grade 6) by irradiation with a visible light, placed outdoors in a situation where ultraviolet light is especially intense, and then studied to determine the degree of recoloring.

Grade 1: Sufficiently rather bold color    Grade 2: Sufficient color    Grade 3: Color can be visibly interpreted
Grade 4: Color is slightly weak    Grade 5: Color is weak    Grade 6: Almost no color

FIG. 16

| | Cyanoacrylate | Cyanoacrylate Volume | Diarylethene Concentration | Type of Ultraviolet Absorbent | Ultraviolet Absorbent Concentration | Stirring Method | Stirred Time | Irradiated Container | Irradiated Liquid Weight | Distance of UV Light from Liquid Surface (cm) | Irradiated Time | Recoloring Confirmed Outdoors (grade) |
|---|---|---|---|---|---|---|---|---|---|---|---|---|
| Comparative Example 4-1 | Cyanoacrylate monomer | 2 g | 1.0% | — | — | Manually stirred with a Scoopula | 5 min * Visibly looks completely dissolved | PP Cup (5 ml) | 2 g | 15 mm | 5 min | Grade 4 |
| Practical Example 4-1 | | | | SEESORB101 | 0.1% | | | | | | | Grade 4.5 |
| Practical Example 4-2 | | | | SEESORB101 | 0.5% | | | | | | | Grade 5.5 |
| Practical Example 4-3 | | | | SEESORB101 | 1.0% | | | | | | | Grade 6 |
| Practical Example 4-4 | | | | SEESORB102 | 0.1% | | | | | | | Grade 4.5 |
| Practical Example 4-5 | | | | SEESORB102 | 0.5% | | | | | | | Grade 5.5 |
| Practical Example 4-6 | | | | SEESORB102 | 1.0% | | | | | | | Grade 6 |
| Practical Example 4-7 | | | | SEESORB701 | 0.1% | | | | | | | Grade 5 |
| Practical Example 4-8 | | | | SEESORB701 | 0.5% | | | | | | | Grade 6 |
| Practical Example 4-9 | | | | SEESORB701 | 1.0% | | | | | | | Grade 6 |

– Diarylethene: 1,2-Bis(2-methylbenzo(b)thiophen-3-yl)hexafluorocyclopentene used
– SEESORB 101: 2-Hydroxy-4-methoxybenzophenone
– SEESORB 102: 2-Hydroxy-4-n-octyloxybenzophenone
– SEESORB 701: 2-(2-Hydroxy-5-methylphenyl)benzotriazole
* SEESORB 101, SEESORB 102, and SEESORB 701 are names of products manufactured by SHIPRO KASEI KAISHA, LTD.
– Subjects sufficiently irradiated with a wavelength of 365 nm to exhibit color were completely decolorized (Grade 6) by irradiation with a visible light, placed outdoors in a situation where ultraviolet light is especially intense, and then studied to determine the degree of recoloring.

Grade 1: Sufficiently rather bold color    Grade 2: Sufficient color    Grade 3: Color can be visibly interpreted
Grade 4: Color is slightly weak    Grade 5: Color is weak    Grade 6: Almost no color

APPLICATION PRODUCT AND APPLICATION SYSTEM

TECHNICAL FIELD

The present invention relates to an application product for applying a material for application such as glue or an adhesive, etc. onto a subject.

BACKGROUND ART

Conventionally, with application products, there have been various suggestions for products wherein the color of the material for application either disappears or changes from the instant that they are applied. Here, the "application product" is a general concept that broadly refers to a product used in order to apply a material for application, not limited to glue, an adhesive, a agglutinant, or a colorant such as ink, but oils and other materials as well onto a subject item.

Accordingly, as one of the abovementioned application products, there is a product commonly referred to as glue sticks (for example, refer to Non-Patent Document 1). In this glue stick, a solid glue presenting alkalinity is contained in a colored state inside a sealed housing by being mixed with a pH indicator. Then, with the solid glue in a colored state, after being applied, the color of the abovementioned pH indicator fades due to contact with air, and in other words, the process of decolorizing occurs. In addition to the advantage of a user being able to easily recognize areas where the glue has not been applied since it is possible to clearly see exactly where the glue has been applied immediately after application, such glue also has the advantage of the areas in which the glue was used being unnoticeable since the glue becomes colorless as described earlier, and these advantages have been a large factor in such glue being widely used by users.

Currently, in order to make it possible to further clearly see exactly where the glue has been applied, there is a demand for a product that has further stronger colors while also being capable of decolorizing to be further unnoticeable after application.

Incidentally, photochromic compounds having characteristics wherein the compounds exhibit color when a light of a certain wavelength is irradiated thereon and become colorless when a light of a different certain wavelength is irradiated thereon are known. Many of these photochromic compounds have characteristics wherein the compounds are capable of clearly exhibiting color when an ultraviolet light of a certain wavelength is irradiated thereon and become colorless when a visible light of a certain wavelength is irradiated thereon. Accordingly, as an example of an application product which makes use of these photochromic compounds, there is the example of photochromic compounds being put to use in writing materials such as markers (for example, refer to Patent Document 1).

However, in regard to these photochromic compounds, although compounds having characteristics wherein the compounds become colorless when a light of natural conditions is irradiated thereon are known (for example, refer to Patent Document 2), the spiropyran-based photochromic compound used in said document is a compound that, regardless of being kept in a light-shielded state, is not able to maintain a state of being colored over a long period of time and gradually decolorizes. For this reason, even if the application product is manufactured in a state of being colored, since the decolorizing process occurs during the stages of storage and distribution that follow, it is not possible for the compound to exhibit adequate color.

PRIOR ART DOCUMENTS

Patent Documents

[Patent Document 1] Japanese Patent Publication No. 4499443
[Patent Document 2] Japanese Patent Publication No. 4578623

Non-Patent Documents

[Non-Patent Document 1] "KOKUYO 2011 General Catalog", Stationary Edition, Kokuyo Co., Ltd., Issued in December, 2010, P. 519

SUMMARY OF THE INVENTION

Problem to be Solved by the Invention

An object of the present invention, devised in light of the points described in the above, is to provide an application product having characteristics that make it possible for areas of application to be easily visible during use such as after application by stabilizing the colored state, while also making it possible for areas of application to be unnoticeable by decolorizing thereafter.

Means for Solving the Problem

In order to achieve the above object, the present invention has taken the measures described below. Namely, the application product according to the present invention is an application product that comprises a material for application, containing a photochromic compound that exhibits color when a certain wavelength light having a certain wavelength is irradiated thereon and becomes colorless when a visible light or a light of natural conditions is irradiated thereon, that exhibits color when said certain wavelength light is irradiated thereon and becomes decolorized when a visible light or a light of natural conditions is irradiated thereon, and a container in which said material for application is accommodated, wherein the application product is characterized by said material for application being designed to be applied to a subject while being in said state of exhibiting color.

In addition, the application system according to the present invention is an application system that is used with an application product that comprises a material for application, containing a photochromic compound that exhibits color when a certain wavelength light having a certain wavelength is irradiated thereon and becomes colorless when a visible light or a light of natural conditions is irradiated thereon, that exhibits color when said certain wavelength light is irradiated thereon and becomes decolorized when a visible light or a light of natural conditions is irradiated thereon, and a container in which said material for application is accommodated, wherein the application system is characterized by having an irradiation means that enables said material for application to be in a state of exhibiting color by irradiating said certain wavelength light onto said material for application until the time of application when said material for application is applied to a subject.

Here, the "decolorized state" in the present invention is a general concept that not only describes the aspect of being completely colorless, but includes the aspect wherein colors are faded to come closer to a state of being colorless, and also includes a state wherein said aspect of faded colors are maintained.

In addition, the "light of natural conditions" refers to light under the condition of being irradiated by sunlight or interior lighting. Specifically, such light mainly consists of visible light while also containing either approximately 5-6% of ultraviolet light contained in sunlight or a trace amount of ultraviolet light contained in interior lighting. In other words, the phrase refers to light that is either identical to sunlight or contains ultraviolet light at a rate of less than that of sunlight. Also, the present invention is not limited to a configuration wherein the material for application prior to being irradiated by the irradiation unit is in a decolorized state, but is limited to a configuration wherein the material for application after being irradiated by the irradiation unit is in a state of exhibiting color.

With such configuration, as the material for application is applied in the state of exhibiting color due to the irradiation unit or the irradiation means, it is possible to provide an application product that makes it possible for areas where the material for application has not been applied to be easily visible during application due to the color being exhibited by the photochromic compound itself, and also makes it possible for traces of application of the material for application to be unnoticeable as the application product enters a decolorized state when brought under visible light or light of natural conditions.

In addition, in order to achieve a material for application that is further visible due to clear coloring, it is preferable that the photochromic compound is a photochromic compound that exhibits color when an ultraviolet light of a certain wavelength is irradiated thereon and become colorless when a visible light is irradiated thereon.

Meanwhile, in order to achieve a material for application that both easily and quickly turns into the decolorized state, the photochromic compound may be a diarylethene-based photochromic compound that exhibits color when an ultraviolet light having a certain wavelength is irradiated thereon and become colorless when a visible light is irradiated thereon.

In addition, in order to achieve a material for application that further easily becomes colorless, it is preferable that the photochromic compound is one that becomes colorless when a light of natural conditions is irradiated thereon.

In order for the color due to the photochromic compound to be further reflected onto the state of the material for application exhibiting color, it is desirable that the material for application has been added with 0.005-5.0 wt %, preferably 0.05-3.0 wt %, or further preferably 0.1-1.0 wt % of the abovementioned photochromic compound in relation to the subject of the additive to which said photochromic compound is added. This is due to the fact that when the added amount of the photochromic compound is less than 0.005 wt % it is difficult for the color due to the state of exhibiting color to be effectively displayed, and in cases when the same is greater than 5.0 wt % it is difficult for an improvement of visibility in the state of exhibiting color to be displayed that makes it worth the increase in the added amount.

Furthermore, in order to make it possible to further ensure a decolorized state due to irradiation of light of a natural state, in addition to the photochromic compound, it is desirable to also contain an ultraviolet absorbent. With such configuration, not only does the decolorized state be effectively maintained, it makes it possible to effectively prevent the material from being colorized again due to irradiation of sunlight.

As a suitable example of the application product described in the above, it is possible to propose an application product that comprises a irradiation unit that is attached to the container and enables the abovementioned material for application to be in the state of exhibiting color by irradiating the abovementioned certain wavelength light towards a passage region that the abovementioned material for application passes through within the abovementioned container upon being applied onto a subject.

In addition, as long as the irradiation unit is configured such that irradiation is directed at the passage region through which the agglutinant immediately prior to being transferred passes through, it is possible for the material for application to be in the state of exhibiting color with clear colors upon being transferred. In addition, if the irradiation unit is attached to the interior of the case, it is possible for such configuration to contribute to a reduction of the size of the transferring tool adhesive product itself.

Thus, as the application product of the present invention, as an example of a configuration that may be suitably used, it is possible to propose a mode wherein this application product is put to use as a transferring tool, wherein the material for application is a agglutinant that is in a state of having been applied to a thin film shaped base in a separable manner to constitute a pressure-sensitive transfer-type tape, and the irradiation unit is attached to the case for the transferring tool which holds the abovementioned pressure-sensitive-type transfer tape.

Accordingly in the case of a transferring tool, as a mode capable of effectively increasing the visibility of the agglutinant, which is the material for application, in the state of exhibiting color, it is possible to propose a configuration wherein the irradiation unit is provided to irradiate the area near the transfer head, which supports the abovementioned base upon the agglutinant being pressed onto the subject on which the agglutinant is to be transferred. With such configuration, it is possible to apply, or in other words, transfer the agglutinant which is a material for application in the state of exhibiting color immediately after being subject to irradiation.

In addition, although it is known in general that photochromic compounds have the characteristic of exhibiting color from the side of the surface on which the certain wavelength light is irradiated, in order to effectively utilize said characteristic, it is desirable that the base is capable of allowing the abovementioned certain wavelength light to pass through, and that the irradiation unit is provided such that the abovementioned certain wavelength light is irradiated from the side of the rear surface of the abovementioned base. This is because, with the agglutinant that is transferred to the subject, the side that had been in contact with the base is exposed.

In order to make it possible to ensure irradiation only during the application of the agglutinant which is a material for application, it is preferable that the irradiation unit is configured such that it is possible for the certain wavelength light to be irradiated in accordance with the action of the transfer head being pressed onto the subject on which the agglutinant is being applied.

Meanwhile, as an example making it possible to suitably realize the present invention, it is possible to propose a configuration wherein the abovementioned material for application in the state of exhibiting color is accommodated in advance in a state of being light-shielded from visible light inside the abovementioned container, wherein this container is a light-shielding container that maintains the abovementioned state of exhibiting color of the abovementioned material for application.

Thus, as such application product, as an example of a configuration that may be suitably used, it is possible to propose a mode wherein the material for application is a agglutinant that is in a state of having been applied to a thin film shaped base in a separable manner to constitute a pressure-sensitive-type transfer tape, and the abovementioned light-shielding container is the case of the transferring tool which holds the abovementioned pressure-sensitive-type transfer tape.

In addition, meanwhile, as another example of a configuration that may be suitably used as an application product of the present invention, it is possible to also propose a mode wherein the material for application in this application product is an adhesive product which is an adhesive in the form of a liquid.

As such adhesive product, as an example capable of effectively utilizing the color of the photochromic compound, it is possible to propose a product commonly referred to as an instantaneous adhesive wherein the adhesive contains cyanoacrylate.

In addition, in listing another example of a configuration that may be suitably used as an application product of the present invention, it is possible to propose a mode of a glue product commonly referred to as stick glue, etc. wherein the material for application is a glue in the form of a solid.

Effects of the Invention

According to the present invention, it is possible to realize an application product that makes it possible for areas where the material for application has not been applied to be easily visible during application due to the color being exhibited by the photochromic compound itself, and also makes it possible for traces of application of the material for application to be unnoticeable as the application product enters a decolorized state when brought under visible light.

BRIEF DESCRIPTION OF THE DRAWINGS

FIG. 13 is a drawing that shows in the form of a table data pertaining to Example 1 of the present invention.

FIG. 14 is a drawing that shows in the form of a table data pertaining to Example 2 of the present invention.

FIG. 15 is a drawing that shows in the form of a table data pertaining to Example 3 of the present invention.

FIG. 16 is a drawing that shows in the form of a table data pertaining to Example 4 of the present invention.

DETAILED DESCRIPTION OF PREFERRED EMBODIMENTS

First Embodiment

Figure 1:
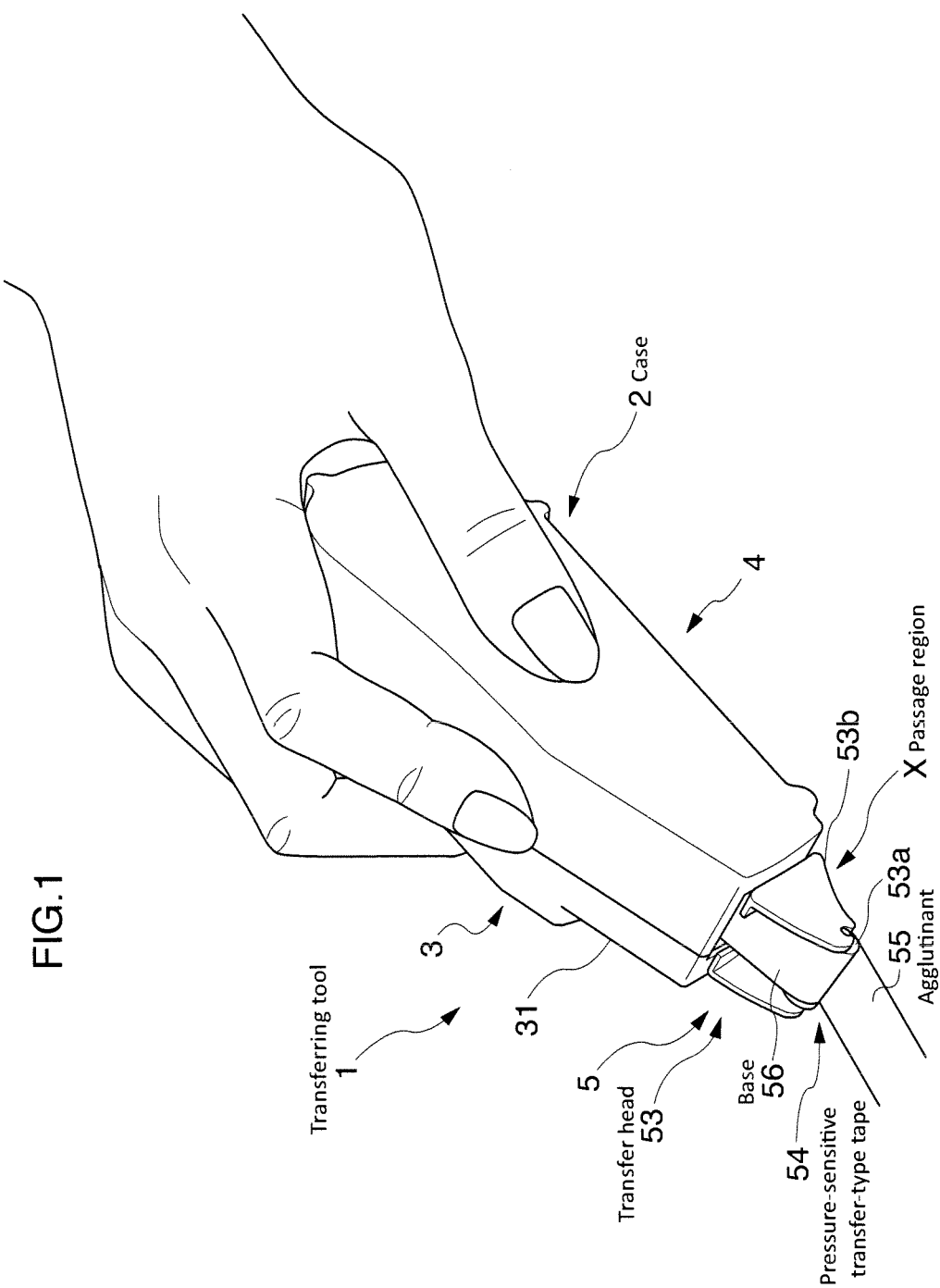
FIG. 1 is an exterior view of a first embodiment according to the present invention.

A first embodiment of the present invention will be explained below in reference to the drawings.

Transferring tool (1) according to the present embodiment which configures an application system according to the present invention and also represents an example of an application product of the same uses an acrylic agglutinant that has been applied to a tape-shaped pressure-sensitive-type transfer tape (54) as the material for application, and is used by transferring agglutinant (55) that is fed in required lengths onto the surface of a subject such as a piece of paper, etc. by sliding transfer head (53) along the surface while maintaining a state of being pressed. Furthermore, pressure-sensitive-type transfer tape (54) consists of agglutinant (55) applied in advance onto one of the surfaces of base (56) that is made of resin and is long in shape while being thin in terms of thickness. In the present embodiment, the main components of transferring tool (1) are case (2) which accommodates agglutinant (55) and components of the feeding mechanism thereof and is in the form of a structure that can be split approximately in half, and refill (5) which is mounted inside this case (2) in a state where pressure-sensitive-type transfer tape (54) is held thereby. Furthermore, although this transferring tool (1) is separately provided with a light-shielding cap that is capable of covering transfer head (53), as it is possible to widely apply existing configurations for the shape of this cap, the illustration and explanation thereof will be omitted in the present embodiment.

Here, transferring tool (1) which is an application product according to the present embodiment comprises agglutinant (55) which is a material for application, containing a photochromic compound that exhibits color when a certain wavelength light having a certain wavelength is irradiated thereon and becomes colorless when a visible light or a light of natural conditions is irradiated thereon, that enters a state of exhibiting color when the certain wavelength light is irradiated thereon and becomes decolorized when a visible light or a light of natural conditions is irradiated thereon, and case (2) which is a container in which said agglutinant (55) is accommodated, and is characterized by agglutinant (55) being designed to be applied to a subject while being in said state of exhibiting color.

Furthermore, this transferring tool (1) is characterized by comprising irradiation unit (34) that is attached to case (2) and enables agglutinant (55) to be in a state of exhibiting color by irradiating an ultraviolet light towards passage region (X) that agglutinant (55) passes through within case (2) upon being applied onto a subject.

The configurations of each part of transferring tool (1) will be explained below. Furthermore, in the present embodiment, FIG. 2 and FIG. 3 are a front view and rear view, respectively, that illustrate the interior structure shown by dissecting the wall of case (2) facing the front side.

Case (2) at least has first case (3) which holds the components of the feeding mechanism, and second case (4) which serves as a lid for this first case (3) via hinges and engagement claws not illustrated. In addition, in the present embodiment, although case (2) may have light-shielding properties, this of course does not prevent a configuration that does not have light-shielding properties.

Second case (4) of course at least is in the form of a shape that makes it possible to serve as a lid for first case (3) on which refill (5) is mounted.

Figure 2:
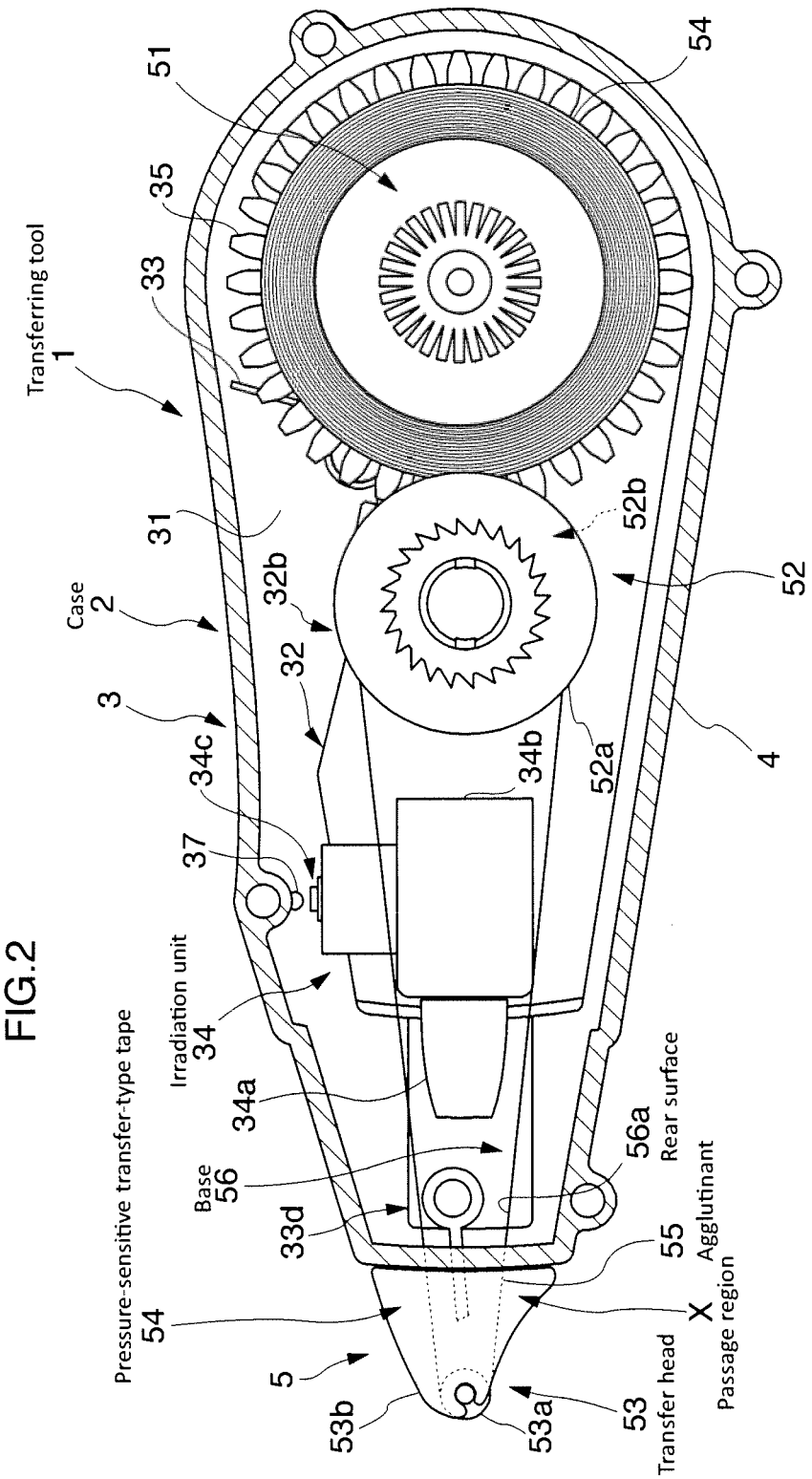
FIG. 2 is a dissected front view that illustrates a part pertaining to the same embodiment.
Figure 3:
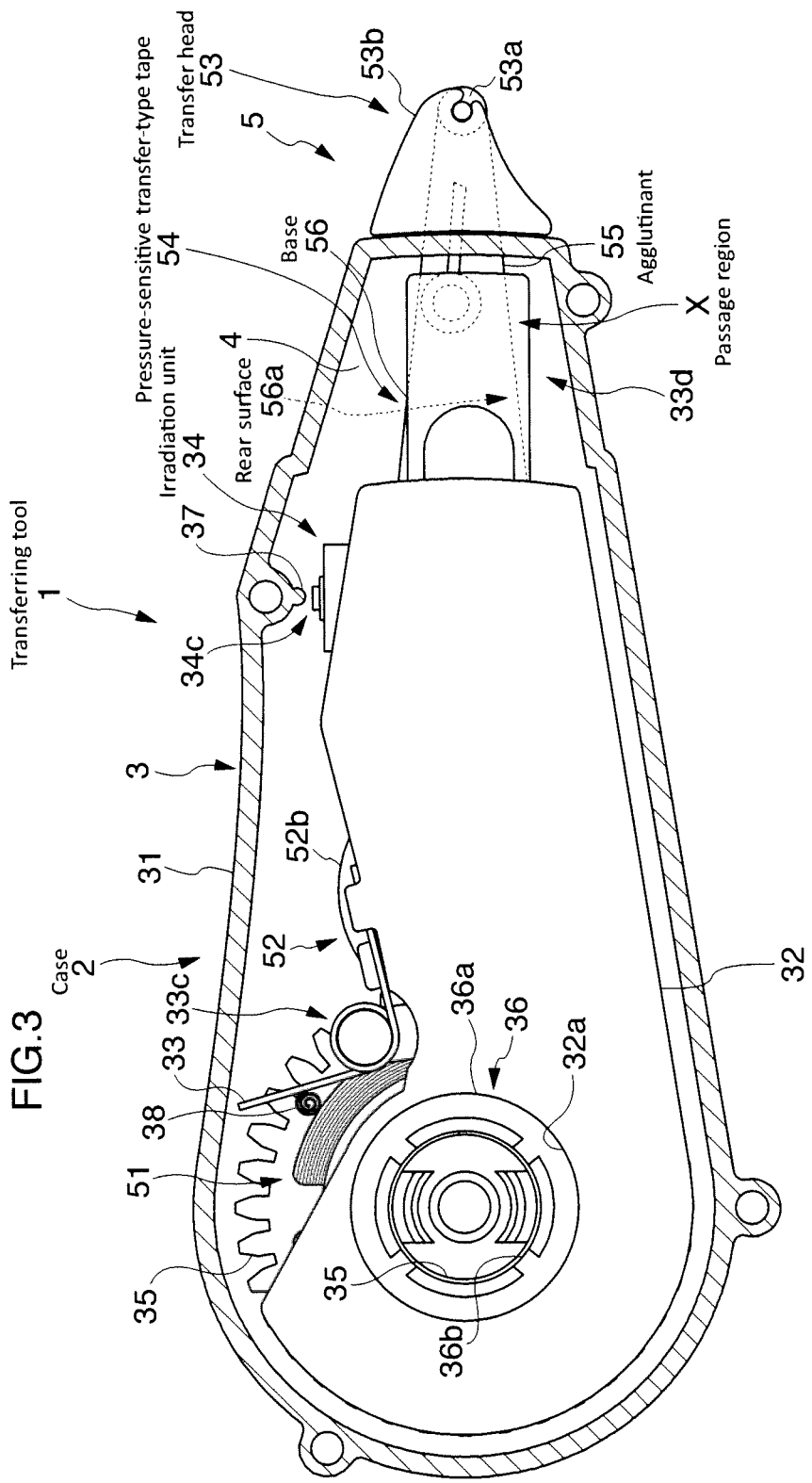
FIG. 3 is a rear view of the same.
Figure 4:
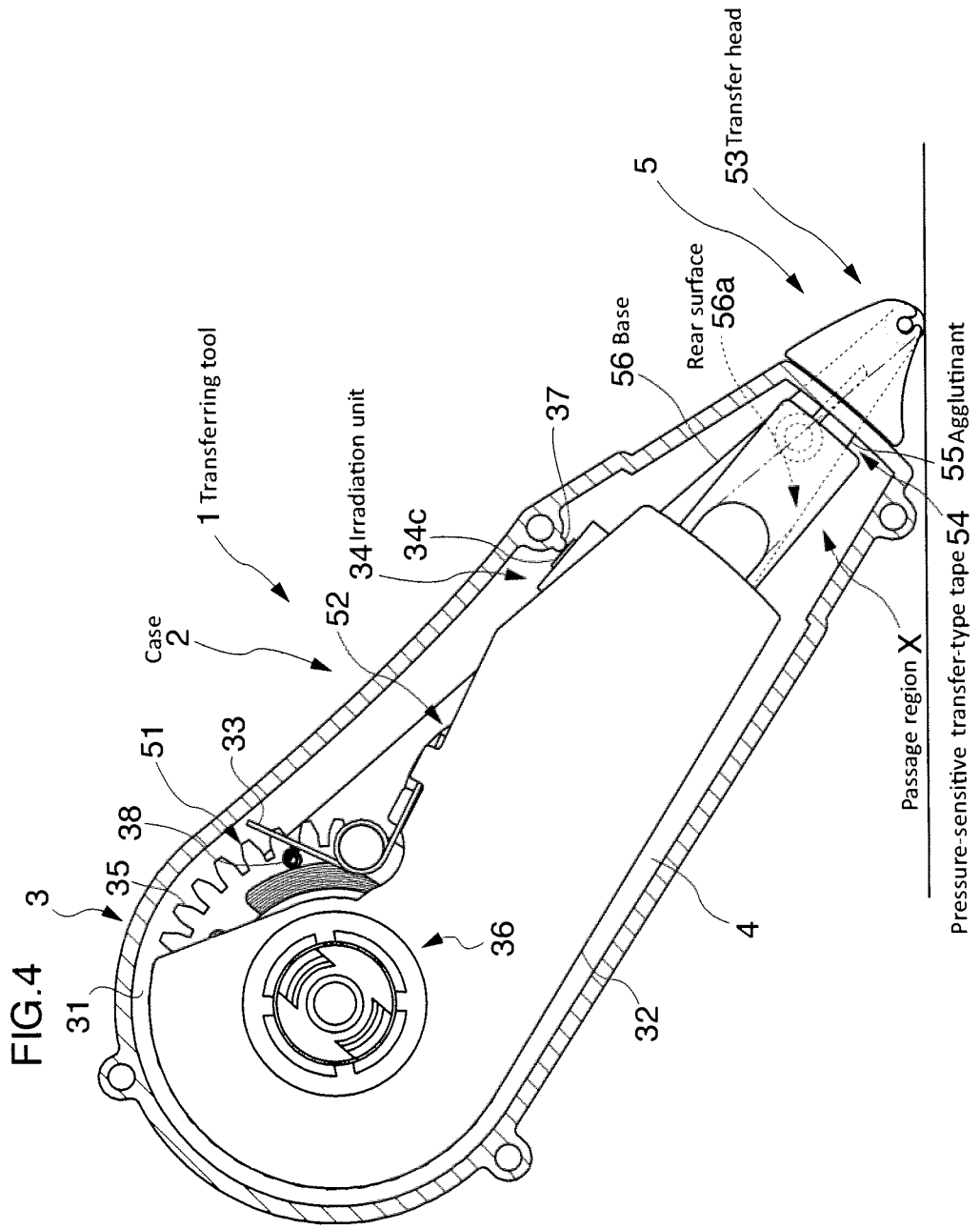
FIG. 4 is an explanatory drawing of operation pertaining to FIG. 3.

First case (3), as illustrated in FIG. 2 through FIG. 4, has case body (31), operating plate (32) supported by case body (31) in a rotatable manner, coil spring (33) attached between case body (31) and operating plate (32), irradiation unit (34) attached to operating plate (32), and feeding gear (35) attached coaxially to operating plate (32). Case body (31) is in the form of the outer shape of first case (3), and for example is made of resin in the form of an opaque color, and has supporting shaft (36) on one end that axially supports operating plate (32) and feeding gear (35), button pressing part (37) which protrudes inwards from case body (31) and is capable of coming into contact with irradiation unit (34), and spring receiver (38) that is in contact with the other end of coil spring (33). Supporting shaft (36) supports operating plate (32) in a rotatable manner at base portion (36a) while axially supporting feeding gear (35) at distal end portion (36b). Operating plate (32) has supported hole (32a) which is fitted onto supporting shaft (36), gear supporting member (32b) which supports winding gear (52b) later described on the side of refill (5), spring attachment portion (33c) which supports one end and the circular portion of coil spring (33), and head attachment portion (33d) for attaching transfer head (53). Coil spring (33) is configured such that one end and the circular portion thereof is attached to operating plate (32) while the other end is attached to be in contact with spring receiver (38) in a state of having an elastic repulsive force. Feeding gear (35), while being axially supported in a rotatable manner by distal end portion (36b) of supporting shaft (36), axially supports on the side of the distal end feeding reel (51) later described on the side of refill (5). This feeding gear (35) is additionally provided with a sliding mechanism not illustrated, and by axially supporting feeding reel (51) via said sliding mechanism, the configuration is such that pressure-sensitive-type transfer tape (54) is sent out at all times in appropriate measurements without slack.

Furthermore, irradiation unit (34) accompanies case (2) by being attached towards the distal end of operating plate (32). In detail, this irradiation unit (34) is attached near transfer head (53), and for example has irradiating end (34a) which is capable of irradiating an ultraviolet light of a wavelength of 365 nm to the side of transfer head (53), power supply (34b) which is attached in an adjacent manner to this irradiating end (34a) and has a battery not illustrated that is built therein, and irradiation button (34c) which is attached on top of power supply (34b) and is capable of distributing the electricity stored in power supply (34b) to irradiating end (34a) by being pressed. Irradiating end (34a) is configured to be capable of irradiating, from near transfer head (53), transfer head (53) and passage region (X) of agglutinant (55) immediately prior to being transferred which is positioned below transfer head (53). In addition, this irradiating end (34a) is configured to irradiate agglutinant (55) from the side of rear surface (56a) of base (56). Power supply (34b) has for example a plurality of button-type batteries not illustrated built therein, and although the configuration is such that these batteries are not to be replaced, it is possible for this power supply (34b) to use a mode that enables utilization of an existing configuration wherein the batteries are replaceable. Irradiation button (34c) is positioned to be in a position that is spaced apart by a slight dimension from button pressing part (37) when transferring tool (1) is in a state of not being used, or in other words, when operating plate (32) is in a state where coil spring (33) is energized, and is configured such that due to the rotation of operating plate (32), by coming into contact with button pressing part (37) and being pressed, electricity is distributed to irradiating end (34a) making it possible for ultraviolet light to be irradiated. Of course however, as long as the abovementioned ultraviolet light is a light of a wavelength that makes it possible for said photochromic compound or other photochromic compounds that may be utilized in the present embodiment to exhibit color, the wavelength of such ultraviolet light is not limited to the abovementioned 365 nm.

Refill (5) serves the purpose of holding agglutinant (55) which is a material for application of the present invention such that makes it possible for agglutinant (55) to be transferred onto a subject while being in a state of being mounted on case (2). This refill (5) specifically is configured to hold pressure-sensitive-type transfer tape (54) which is configured of agglutinant (55) applied on the side of the front surface of base (56). Furthermore, apart from pressure-sensitive-type transfer tape (54), refill (5) is provided with feeding reel (51) which wraps and holds most of pressure-sensitive-type transfer tape (54) when unused, winding reel (52) which winds pressure-sensitive-type transfer tape (54) either in a state of being configured of only base (56) after agglutinant (55) has been transferred or in a state where base (56) supports agglutinant (55) that was not capable of being transferred, and transfer head (53) which serves the purpose of pressing pressure-sensitive-type transfer tape (54) onto a subject. Furthermore, said refill (5) has a supporting plate not illustrated which holds feeding reel (51), winding reel (52), and transfer head (53) in a state where these are arranged in a single straight line. With this supporting plate, feeding reel (51), winding reel (52), and transfer head (53) are held inside case (2) such that they are sandwiched from the front surface and rear surface by this supporting plate and the abovementioned operating plate (32). In addition, it is made possible for the entirety of refill (5) to be easily mounted on first case (3) with only the operation of attaching and detaching this supporting plate. Winding reel (52) has reel body (52a) which winds either base (56) or pressure-sensitive-type transfer tape (54) fed through transfer head (53), and winding gear (52b) which is integrally formed on this reel body (52a) and is capable of meshing with a certain gear ratio with the abovementioned feeding gear (35). Transfer head (53) serves the purpose of supporting pressure-sensitive-type transfer tape (54) from rear surface (56a) of base (56) when said pressure-sensitive-type transfer tape (54) is pressed onto a subject, and has a transferring roller (53a) which is capable of rotating in accordance with the operation of base (56) that is being sent out, and roller supporting portion (53b) which supports this transferring roller (53a) in a rotatable manner.

Thus, transferring tool (1) which is an application product according to the present embodiment has agglutinant (55) having the characteristic of entering a state of exhibiting color when an ultraviolet light is irradiated thereon and entering a decolorized state when a light of natural conditions is irradiated thereon due to agglutinant (55) applied on the pressure-sensitive-type transfer tape (54) containing a photochromic compound that exhibits color when an ultraviolet light having a certain wavelength is irradiated thereon and becomes colorless when a visible light or a light of natural conditions is irradiated thereon.

Again, here the "light of natural conditions" refers to light under the condition of being irradiated by sunlight or interior lighting. Specifically, such light mainly consists of visible light while also containing either approximately 5-6% of ultraviolet light contained in sunlight or a trace amount of ultraviolet light contained in interior lighting. In other words, the phrase refers to light that is either identical to sunlight or contains ultraviolet light at a rate of less than that of sunlight.

From here, the configuration of pressure-sensitive-type transfer tape (54) according to the present embodiment will be explained.

Agglutinant (55) mainly consists of an acrylic agglutinant which is mainly a subject to the additive, and contains a photochromic compound added thereto by 0.1-1.0 wt % in relation to the weight of this acrylic agglutinant. As the acrylic agglutinant, although in the present embodiment is an acrylic emulsion agglutinant (55) capable of being applied alone to base (56) without utilizing a solvent, etc., it is also possible to use a solvent-based agglutinant (55) that is applied to base (56) in a state of being dissolved in a solvent. Furthermore, this photochromic compound, in this embodiment, is a diarylethene-based photochromic compound that exhibits color when an ultraviolet light having a wavelength of 365 nm is irradiated thereon and become colorless when a visible light or a light of natural conditions is irradiated thereon. In the present embodiment, specifically as an example of such diarylethene-based photochromic compound, 1,2-Bis(2-methylbenzo(b)thiophen-3-yl) hexafluorocyclopentene is used. Of course however, as long as the photochromic compound is a diarylethene-based photochromic compound that satisfies the characteristics wherein the compound "exhibits color when a ultraviolet light is irradiated thereon and becomes colorless when a visible light or a light of natural conditions is irradiated thereon", it is also possible for an existing compound or of course a compound yet to be found to be suitably applied. In addition of course, said photochromic compound, apart from being a diarylethene-based compound, may be a spiropyran-based photochromic compound, and may even be a compound wherein these types of compounds are mixed together. Furthermore, agglutinant (55) according to the present embodiment, in addition to the photochromic compound described in the above, contains an ultraviolet absorbent by for example 0.1-1.0 wt %. Due to this configuration, in cases when a light of natural conditions is irradiated thereon, as the ultraviolet light contained in that light is absorbed by the ultraviolet absorbent, it becomes further easier for the visible light to function in relation to the photochromic compound to quickly turn the compound into the decolorized state.

For base (56), in the present embodiment a transparent polyethylene terephthalate (PET) having both sides treated with a process to enable separation is applied. Of course this base is configured such that it is possible for ultraviolet light having a wavelength of 365 nm to pass through. In addition, base (56) is not limited to being of the material utilized in the present embodiment and it is possible for a variety of existing materials to be applied therefor.

Next, the operation as well as the functions upon transferring of transferring tool (1) according to the present embodiment will be described in detail while referring to FIG. 2 through FIG. 4. As illustrated in said drawings, in said transferring tool (1), due to the configuration wherein feeding reel (51), winding reel (52), irradiation unit (34), and transfer head (53) are aligned in a single straight line from the front view or the back view, these are arranged inside case (2) without any gaps, thus contributing to a reduction of the size of case (2) itself.

When this transferring tool (1) is used, due to ultraviolet light being emitted from irradiating end (34a) of irradiation unit (34) arranged in between transfer head (53) and winding reel (52), the ultraviolet light is irradiated onto agglutinant (55) at passage region (X) near transfer head (53), thus causing agglutinant (55) to be in a state of exhibiting color.

To specifically explain this, when transfer head (53) is pressed against a subject, in resistance to the elastic energized force of coil spring (33), operating plate (32) rotates as a whole together with refill (5) while being centered on supporting shaft (36). Subsequently, when transfer head (53) is pressed against the subject with enough force to enable the transfer of agglutinant (55), irradiation button (34c) of irradiation unit (34) attached to operating plate (32) comes into contact with button pressing part (37) of first case (3) and thus becomes pressed. Due to this, the electricity stored in power supply (34b) is distributed to irradiating end (34a) and ultraviolet light having a wavelength of 365 nm is irradiated onto passage region (X). This ultraviolet light is configured such that the abovementioned ultraviolet light is irradiated toward agglutinant (55) from the side of rear surface (56a) of base (56) that is made of transparent polyethylene terephthalate (PET). Due to this configuration, agglutinant (55) in a state of exhibiting color is transferred onto the subject. In addition, when transfer head (53) leaves the subject, due to coil spring (33) elastically energizing operating plate (32), button pressing part (37) and irradiation button (34c) are returned to being spaced apart, thus suspending the irradiation of ultraviolet light.

Subsequently, although agglutinant (55) in a state of exhibiting color retains this state of exhibiting color for a while after being transferred, the color gradually fades due to passage of time and eventually reaches a decolorized state. This occurs because, due to the diarylethene-based photochromic compound which has formed a ring-closed body contained in agglutinant (55) being irradiated with the visible light of the light of natural conditions, the reaction of transitioning into a ring-opened body which is an isomer thereof proceeds and is then completed.

With the configuration as described in the above, transferring tool (1), which is an application product according to the present embodiment, makes it possible for areas where agglutinant (55) has not been applied to be easily visible during application due to the color being exhibited by the photochromic compound itself, and also makes it possible for traces of application of agglutinant (55) to be unnoticeable as agglutinant (55) enters a decolorized state when brought under light of natural conditions.

In addition, by irradiation unit (34) being provided in the present embodiment, it is possible to ensure the state of exhibiting color prior to agglutinant (55) being transferred, or in other words applied, onto a subject.

Furthermore, in the present embodiment, as irradiation unit (34) is configured to irradiate towards the passage region through which agglutinant (55) passes immediately prior to being transferred, it is possible for agglutinant (55) to be in a state of exhibiting color with clear colors upon being transferred. Additionally, as the irradiation unit is built into case (2), this contributes to a reduction of the size of transferring tool (1) itself.

In addition, in the present embodiment, a diarylethene-based photochromic compound being applied as the photochromic compound realizes achievement of agglutinant (55) that is easily visible due to clear coloring.

Furthermore, in the present embodiment, as the configuration is such that said photochromic compound is added by 0.005-5.0 wt %, preferably 0.05-3.0 wt %, or further preferably 0.1-1.0 wt % in relation to the subject of the additive to which said photochromic compound is added, the color due to the photochromic compound is further reflected onto the state of the material for application exhibiting color.

Furthermore, as agglutinant (55) according to the present embodiment is configured to contain, in addition to the photochromic compound, an ultraviolet absorbent by for example 0.1-1.0 wt %, in cases when a light of natural conditions is irradiated thereon, as the ultraviolet light contained in that light is absorbed by the ultraviolet absorbent, it becomes further easier for the visible light to function in relation to the photochromic compound to quickly turn the compound into the decolorized state.

Especially in the case of transferring tool (1) according to the present embodiment, in order to effectively increase visibility of agglutinant (55) which is a material for application in the state of exhibiting color, irradiation unit (34) is configured to irradiate near transfer head (53) that supports base (56) upon agglutinant (55) being pressed against and transferred onto a subject. Due to this, it is possible to transfer agglutinant (55) that is in a state of exhibiting easily visible color immediately after being subject to irradiation.

In addition, in the present embodiment, as base (56) is configured to make it possible for ultraviolet light to pass through, irradiation unit (34) is configured to irradiate ultraviolet light from the side of rear surface (56a) of base (56), and with agglutinant (55) transferred onto a subject, since the side that had been in contact with the directly irradiated base (56) is exposed, the transferred agglutinant (55) exhibits further excellent visibility. Additionally, as irradiation unit (34) is positioned on the side of rear surface (56a) of base (56), even in cases when base (56) becomes disorderly positioned in another space within case (2) due to such as slacking, etc. within case (2), since agglutinant (55) is positioned from irradiation unit (34) on the opposite side via base (56), it is possible to effectively avoid trouble wherein agglutinant (55) accidentally sticks to irradiation unit (34).

Additionally in the present embodiment, in order to make it possible to ensure irradiation without waste only during application of agglutinant (55) which is a material for application, irradiation unit (34) is configured such that ultraviolet light is irradiated in accordance with the operation of transfer head (53) being pressed onto a subject.

Second Embodiment

Figure 5:
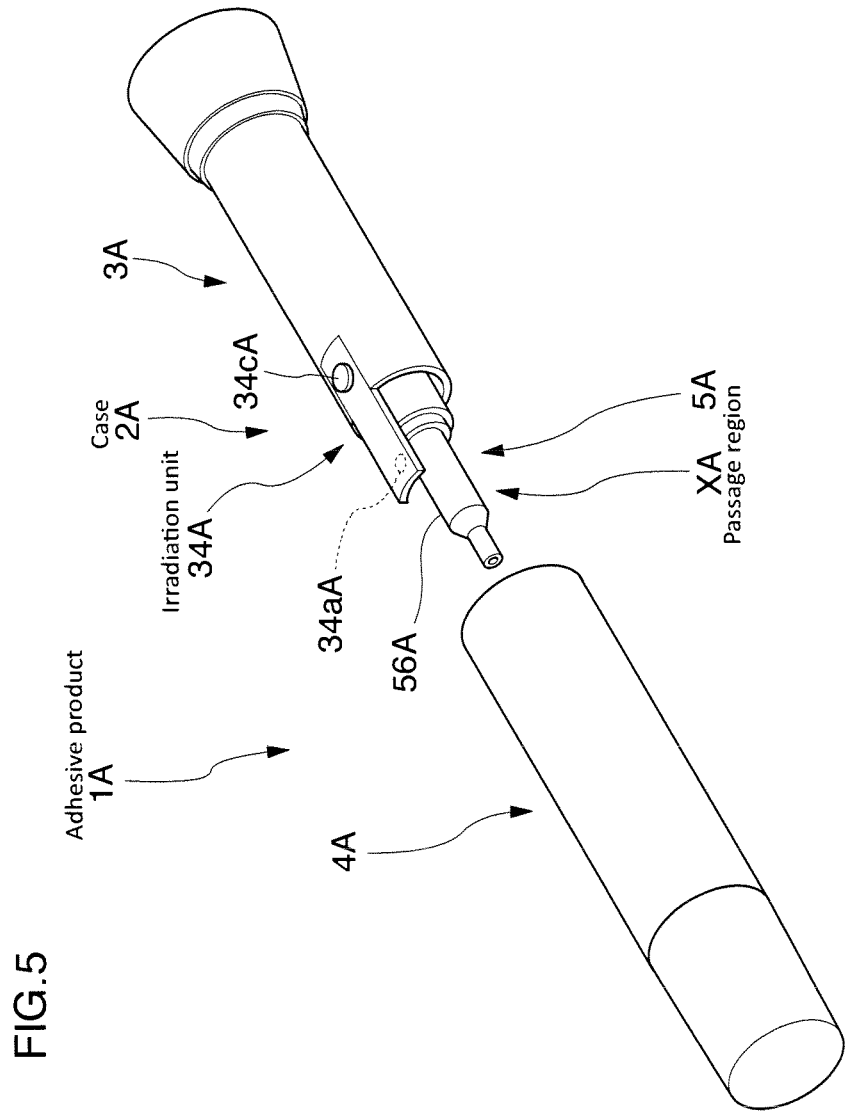
FIG. 5 is an exterior view of a second embodiment according to the present invention.

Adhesive product (1A) which is an application product according to a second embodiment of the present invention will be explained below while referring to FIG. 5 and FIG. 6. In said embodiment, components that are equivalent to the components of the embodiment described earlier will be referred to using the same numbers yet with an "A" added, and the detailed explanations thereof will be appropriately omitted.

Adhesive product (1A) which is an application product according to the present invention is what is commonly referred to as an "instantaneous adhesive" and is mainly configured of a cyanoacrylate mixed together with a photochromic compound added by 0.005-5.0 wt %, preferably 0.05-3.0 wt %, or further preferably 0.1-1.0 wt % in relation to the weight of the subject of the additive.

This adhesive product (1A), similar to the embodiment described earlier, is characterized by comprising adhesive (55A) which is a material for application, containing a photochromic compound that exhibits color when an ultraviolet light which is a certain wavelength light having a certain wavelength is irradiated thereon and becomes colorless when a visible light or a light of natural conditions is irradiated thereon, that enters a state of exhibiting color when the ultraviolet light is irradiated thereon and enters a decolorized state when a visible light or a light of natural conditions is irradiated thereon, case (2A) which is a container in which said adhesive (55A) is accommodated, and irradiation unit (34A) which is attached to this case (2A) and makes it possible for adhesive (55A) to be in a state of exhibiting color by irradiating ultraviolet light which is a certain wavelength light towards passage region (XA) that adhesive (55A) passes through within case (2A) upon being applied onto a subject.

This adhesive product (1A) specifically has case (2A), refill (5A) wherein adhesive (55A) is encapsulated in encapsulating body (56A) formed of transparent resin, and irradiation unit (34A) which is capable of irradiating ultraviolet light to passage region (XA) that adhesive (55A) passes through at the side of the distal end side of refill (5A). Of course the abovementioned ultraviolet light, similar to the first embodiment described earlier, is only required to be a light of a wavelength that makes it possible for said photochromic compound or other photochromic compounds that may be utilized in the present embodiment to exhibit color. In other words, the wavelength of such ultraviolet light is not limited to being 365 nm similar to the embodiment described earlier.

As case (2A), for example it is possible to propose a configuration made of a synthetic resin or an aluminum tube. In addition, case (2A) specifically has a main body case (3A) which is capable of accommodating adhesive (55A), and cap (4A) which is capable of serving as a lid for this main body case (3A). In addition, in the present embodiment, although case (2A) may have light-shielding properties, this of course does not prevent a configuration that does not have light-shielding properties.

Refill (5A) consists of adhesive (55A) encapsulated in encapsulating body (56A) which is for example formed of a resin having flexibility that is either transparent or has light-transmitting properties.

Encapsulating body (56A) encapsulates adhesive (55A) when unused, and during use, it is capable of applying adhesive (55A) by a hole that is bored at the distal end thereof with such as a needle not illustrated. After the hole has been bored, adhesive (55A) is discharged from the hole for example by being pressed with fingers, etc. during use and is applied to a subject. Furthermore, in the present embodiment, the distal end of encapsulating body (56A) being formed in a thin tubular shape constitutes passage region (X) according to the present invention. Furthermore, although the present embodiment is separately provided with, apart from encapsulating body (56A), a needle-shaped body which is capable of boring a hole in the distal end of encapsulating body (56A) and plugging said hole, as this needle-shaped body appropriately utilizes an existing configuration, the illustration and explanation of said needle-shaped body will be omitted in the present embodiment.

Adhesive (55A), as described in the above, is mainly configured of a cyanoacrylate mixed together with a photochromic compound similar to that of the first embodiment described earlier for example added by 0.005-5.0 wt %, preferably 0.05-3.0 wt %, or further preferably 0.1-1.0 wt % in relation to the subject of the additive.

Furthermore, irradiation unit (34A), by means of irradiation button (34cA) being pressed, is capable of irradiating, in a similar manner to the embodiment described earlier, ultraviolet light having a wavelength of 365 nm from irradiating end (34aA) to passage region (XA) positioned at the distal end of encapsulating body (56A). Furthermore, although a power supply is not illustrated with irradiation unit (34A) according to the present embodiment, as it is possible for a power supply to be arranged in an appropriate place, such as for example the power supply being appropriately positioned by the base end of main body case (3A), a detailed explanation thereof will be omitted.

Figure 6:
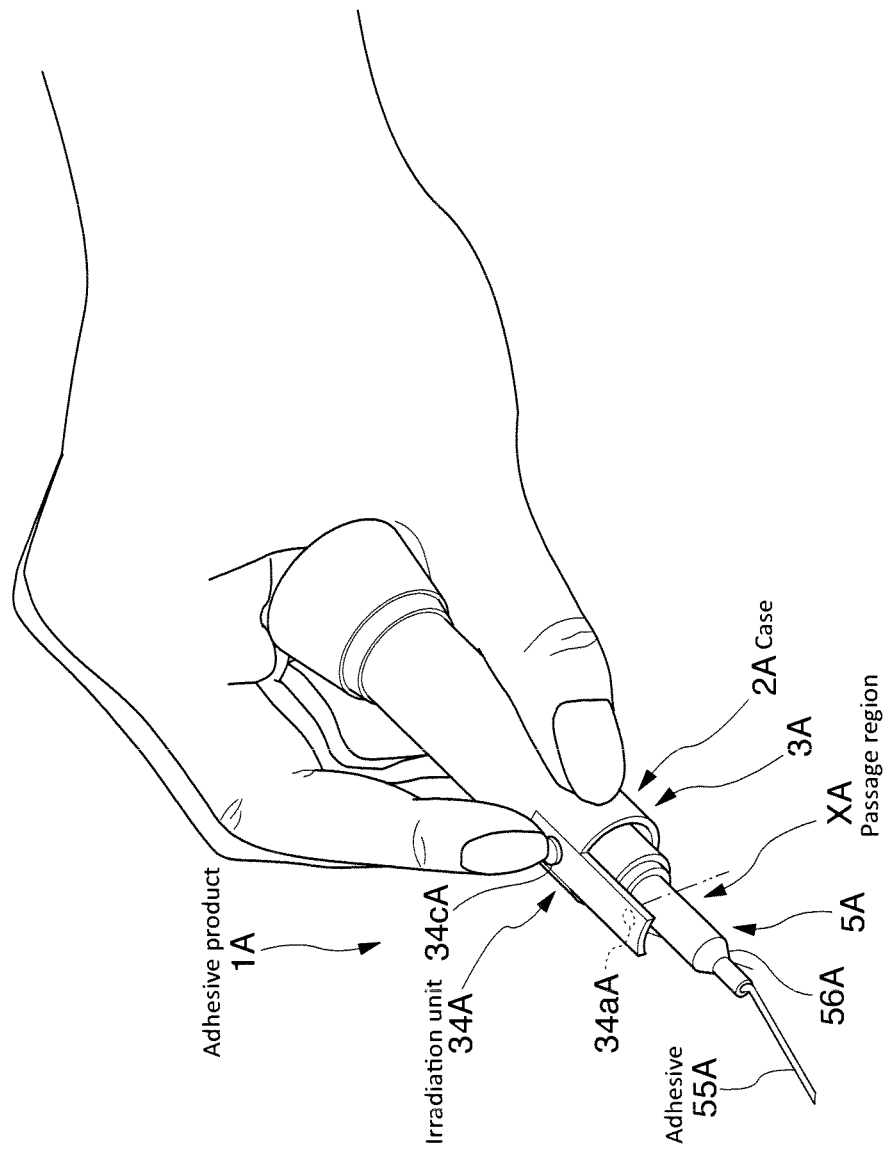
FIG. 6 is an explanatory drawing of operation pertaining to the same embodiment.

Furthermore, as illustrated in FIG. 6, when using this adhesive product (1A), first cap (4A) is removed from main body case (3A), and subsequently, while pressing on an appropriate place of encapsulating body (56A) with their fingers, the user applies adhesive (55A) while pressing irradiation button (34cA). Accordingly, ultraviolet light that is emitted from irradiating end (34aA) is irradiated onto adhesive (55A) via passage region (XA) of encapsulating body (56A). Due to this, adhesive (55A) that is applied enters a state of exhibiting color and becomes suitably visible to the user. In addition, in a similar manner to the embodiment described earlier, this adhesive (55A) eventually reaches a decolorized state due to passage of time. Again, in a similar manner to the embodiment described earlier, this occurs because, due to the diarylethene-based photochromic compound which has formed a ring-closed body contained in adhesive (55A) being irradiated with the visible light of the light of natural conditions, the reaction of transitioning into a ring-opened body which is an isomer thereof proceeds.

With such configuration, as an application product of the present invention, even with adhesive product (1A) capable of applying a liquid adhesive (55A), in a similar manner to the first embodiment described earlier, as it is easy to confirm where adhesive (55A) has been applied during application due to the color being exhibited by the photochromic compound itself, it is further easier to visually recognize unapplied areas, and as adhesive product (1A) enters a decolorized state when brought under light of natural conditions, it is also possible for traces of application of adhesive (55A) to be unnoticeable.

Although it is possible for transferring tool (1) and adhesive product (1A), which are each an application product according to each embodiment described earlier, alone to simultaneously configure an application system according to the present invention, an application product that is capable of configuring an application system according to the present invention is not limited to those that configure an application system alone. In other words, an application product may also include a mode wherein a material for application treated in advance to be in a state of exhibiting color by a separately configured irradiation means is held in a state of being shielded from light.

Third Embodiment

An application product that is capable of configuring an application system according to the present invention will be explained below. Furthermore, in regard to the transferring tool which is an application product that represents the present embodiment, components that are equivalent to the components of the first embodiment described earlier will be explained using the same reference numbers for convenience.

Figure 7:
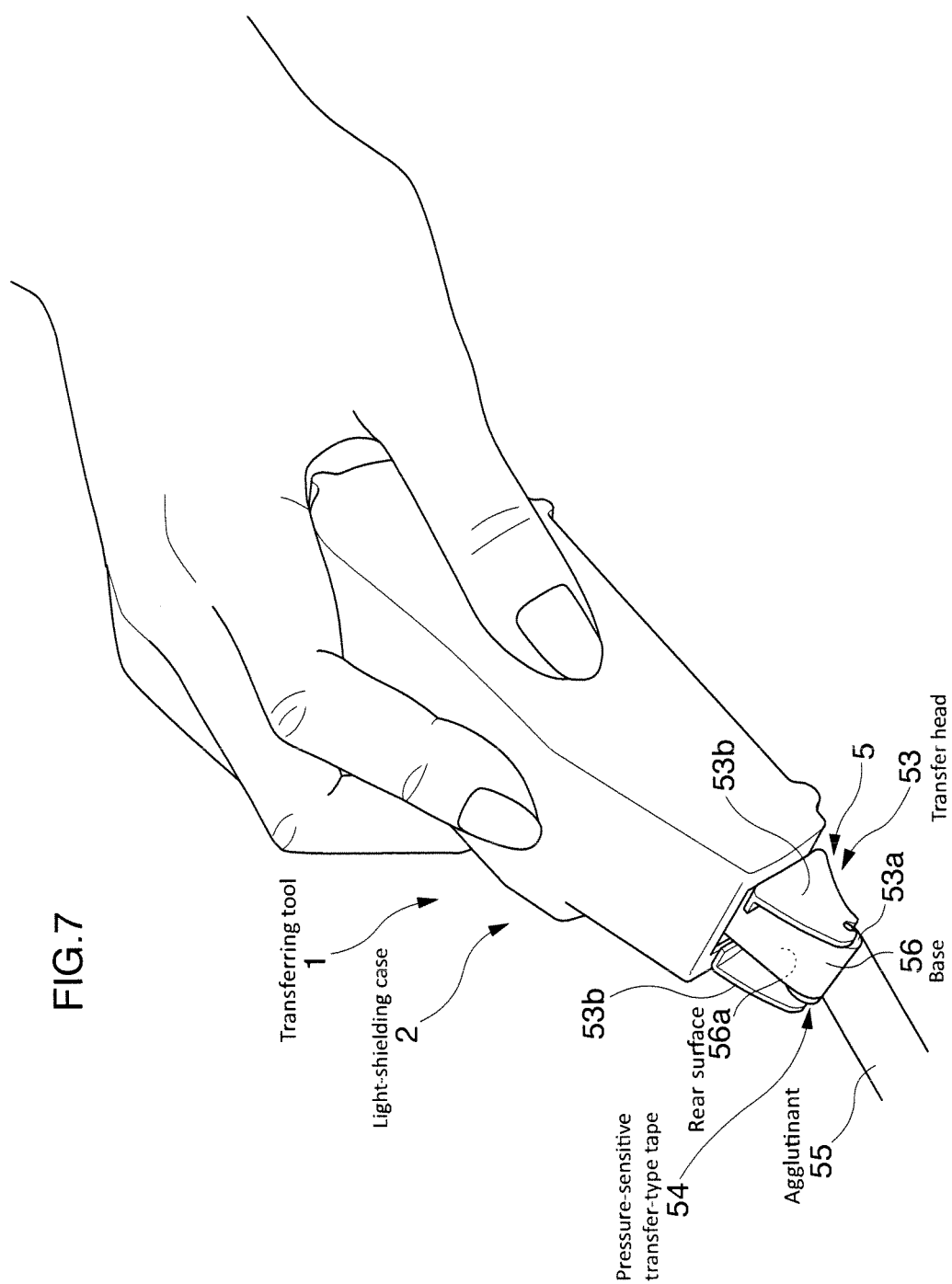
FIG. 7 is an exterior view of a third embodiment according to the present invention.

Transferring tool (1) according to the present embodiment which represents an example of an application product according to the present invention, as illustrated in FIG. 7, for example uses an acrylic agglutinant that has been applied to a tape-shaped pressure-sensitive-type transfer tape (54) as the material for application, and is used by transferring agglutinant (55) that is fed in required lengths onto the surface of a subject such as a piece of paper, etc. by sliding transfer head (53) along the surface while maintaining a state of being pressed. Furthermore, pressure-sensitive-type transfer tape (54) consists of agglutinant (55) applied in advance onto one of the surfaces of base (56) that is made of resin and is long in shape while being thin in terms of thickness. In the present embodiment, the main components of transferring tool (1) are light-shielding case (2) which accommodates agglutinant (55) and components of the feeding mechanism thereof, and tape accommodating portion (5) which is mounted inside this light-shielding case (2) in a state where pressure-sensitive-type transfer tape (54) is held thereby. Furthermore, although this transferring tool (1) is separately provided with a light-shielding cap that is capable of covering transfer head (53), as it is possible to widely apply existing configurations for the shape of this cap, the illustration and explanation thereof will be omitted in the present embodiment.

Here, transferring tool (1) which is an application product that configures an application system according to the present embodiment, similar to with the first embodiment described earlier, comprises agglutinant (55) which is a material for application that, due to having a diarylethene-based photochromic compound that exhibits color when ultraviolet light having a certain wavelength is irradiated thereon and becomes colorless when a light of natural conditions is irradiated thereon, enters a decolorized state from being in a state of exhibiting color when a light of natural conditions is irradiated thereon, and light-shielding case (2) in which this agglutinant (55) is accommodated, and is configured such that adhesive (55) is applied to a subject while being in a state of exhibiting color.

Specifically, the above is characterized by comprising light-shielding case (2) which is a light-shielding container in which this agglutinant (55), as a material for application prepared in advance to be in a state of exhibiting color by an irradiation means not illustrated that configures an application system according to the present invention, is accommodated in a state of being shielded from visible light.

In addition, transferring tool (1) according to the present embodiment is manufactured by a manufacturing method of an application product comprising a material for application creating step wherein agglutinant (55) which is a material for application that, due to having a diarylethene-based photochromic compound that exhibits color when ultraviolet light having a certain wavelength is irradiated thereon and becomes colorless when a light of natural conditions is irradiated thereon added to a subject of the additive, enters a decolorized state from being in a state of exhibiting color when a light of natural conditions is irradiated thereon, a irradiating step wherein agglutinant (55) is prepared to be in a state of exhibiting color by irradiating ultraviolet light onto agglutinant (55) that has been created, and a packing step wherein agglutinant (55) that has undergone this irradiating step is packed while being in the state of exhibiting color into light-shielding case (2) which is a light-shielding container that has light-shielding properties. In other words, the packing step in the manufacturing method of an application product according to the present invention is a step wherein tape accommodating portion (5) is accommodated into light-shielding case (2) to be in a state as illustrated in FIG. 7.

The configurations of each part in transferring tool (1) will be explained below. This transferring tool (1) is configured such that the tape accommodating portion is supported within the light-shielding case. Furthermore, although the transferring tool according to the present embodiment is configured such that transferring tool (1) is a so-called disposable type wherein, after use of pressure-sensitive-type transfer tape (54), light-shielding case (2) and tape accommodating portion (5), or in other words transferring tool (1) is replaced as a whole, of course it is possible for this to be a so-called refill replacement type with which it is possible to replace only tape accommodating portion (5).

Light-shielding case (2) is at least configured to be capable of shielding the light of visible light from outside and is configured to accommodate and support the components of the feeding mechanism together with tape accommodating portion (5). In a state where the cap not illustrated described in the above is mounted on this light-shielding case (2), tape accommodating portion (5) is placed in a state of being completely shielded from light. In other words, the packing step in the manufacturing method of an application product according to the present invention is a step wherein tape accommodating portion (5) is accommodated into light-shielding case (2) to be in a state as illustrated in FIG. 7.

Tape accommodating portion (5) serves the purpose of holding agglutinant (55) which is a material for application of the present invention such that makes it possible for agglutinant (55) to be transferred onto a subject while being in a state of being mounted on case (2). This tape accommodating portion (5) specifically is configured to hold pressure-sensitive-type transfer tape (54) which is configured of agglutinant (55) applied on the side of the front surface of base (56). Furthermore, apart from pressure-sensitive-type transfer tape (54), tape accommodating portion (5) is provided with a feeding reel not illustrated which wraps and holds most of pressure-sensitive-type transfer tape (54) when unused, a winding reel not illustrated which winds pressure-sensitive-type transfer tape (54) either in a state of being configured of only base (56) after agglutinant (55) has been transferred or in a state where base (56) supports agglutinant (55) that was not capable of being transferred, and transfer head (53) which serves the purpose of pressing pressure-sensitive-type transfer tape (54) onto a subject. Transfer head (53) serves the purpose of supporting pressure-sensitive-type transfer tape (54) from rear surface (56a) of base (56) when said pressure-sensitive-type transfer tape (54) is pressed onto a subject, and has a transferring roller (53a) which is capable of rotating in accordance with the operation of base (56) that is being sent out, and roller supporting portion (53b) which supports this transferring roller (53a) in a rotatable manner.

Thus, transferring tool (1) which is an application product according to the present embodiment has agglutinant (55) having the characteristic of entering a state of exhibiting color when an ultraviolet light is irradiated thereon and entering a decolorized state when a light of natural conditions is irradiated thereon due to agglutinant (55) applied on the pressure-sensitive-type transfer tape (54) containing a diarylethene-based photochromic compound that exhibits color when an ultraviolet light having a certain wavelength is irradiated thereon and becomes colorless when a light of natural conditions is irradiated thereon.

Again, here the "light of natural conditions" refers to light under the condition of being irradiated by sunlight or interior lighting. Specifically, such light mainly consists of visible light while also containing either approximately 5-6% of ultraviolet light contained in sunlight or a trace amount of ultraviolet light contained in interior lighting. In other words, the phrase refers to light that is either identical to sunlight or contains ultraviolet light at a rate of less than that of sunlight.

From here, the configuration of pressure-sensitive-type transfer tape (54) according to the present embodiment will be explained.

Agglutinant (55) mainly consists of an acrylic agglutinant which is mainly a subject to the additive, and contains a photochromic compound added thereto by 0.005-5.0 wt %, preferably 0.05-3.0 wt %, or further preferably 0.1-1.0 wt % in relation to the weight of this acrylic agglutinant. In other words, the material for application creating step in the manufacturing method of an application product according to the present invention is a step where in such manner, a photochromic compound is added in relation to an acrylic agglutinant (55) which is a subject to the additive. In addition, as the acrylic agglutinant, although in the present embodiment is an acrylic emulsion agglutinant (55) capable of being applied alone to base (56) without utilizing a solvent, etc., it is also possible to use a solvent-based agglutinant (55) that is applied to base (56) in a state of being dissolved in a solvent. Furthermore, this photochromic compound, in this embodiment, is for example a diarylethene-based photochromic compound that exhibits color when an ultraviolet light having a wavelength of 365 nm is irradiated thereon and become colorless when a light of natural conditions is irradiated thereon. Of course however, as long as the abovementioned ultraviolet light is a light of a wavelength that makes it possible for said photochromic compound or other photochromic compounds that may be utilized in the present embodiment to exhibit color, the wavelength of such ultraviolet light is not limited to the abovementioned 365 nm. In the present embodiment, specifically as an example of such diarylethene-based photochromic compound, 1,2-Bis(2-methylbenzo(b)thiophen-3-yl)hexafluorocyclopentene is used. Of course however, as long as the photochromic compound is a diarylethene-based photochromic compound that satisfies the characteristics wherein the compound "exhibits color when a ultraviolet light is irradiated thereon and becomes colorless when a light of natural conditions is irradiated thereon", it is also possible for an existing compound or of course a compound yet to be found to be suitably applied. In addition of course, said photochromic compound, apart from being a diarylethene-based compound, may be a spiropyran-based photochromic compound, and may even be a compound wherein these types of compounds are mixed together. Furthermore, the material for application according to the present embodiment, or in other words agglutinant (55), in addition to the photochromic compound described in the above, contains an ultraviolet absorbent. Due to this configuration, in cases when a light of natural conditions is irradiated thereon, as the ultraviolet light contained in that light is absorbed by the ultraviolet absorbent, it becomes further easier for the visible light to function in relation to the photochromic compound to quickly turn the compound into the decolorized state.

1,2-Bis(2-methylbenzo(b)thiophen-3-yl)hexafluorocyclopentene which is a diarylethene-based photochromic compound that configures agglutinant (55) according to the present embodiment is a compound that displays values of 0.35, which are higher than with existing compounds, for both the reactive quantum yield displayed during ring-closed reaction when exhibiting color and the reactive quantum yield displayed during ring-opened reaction when becoming colorless. Especially in comparison to existing diarylethene-based photochromic compounds, properties are exhibited wherein the reactive quantum yield displayed during ring-opened reaction due to irradiation of visible light is remarkably high. Due to this, even in cases when a light of natural conditions that for example with sunlight contains ultraviolet light by 5-6% is irradiated thereon, ring-opened reaction proceeds in preference to become colorless. Thus of course, agglutinant (55) that contains said 1,2-Bis(2-methylbenzo(b)thiophen-3-yl)hexafluorocyclopentene enters a decolorized state in accordance with this. However, depending on the season or location, it is possible that the balance of ultraviolet light and visible light contained in sunlight will change, and due to this balance, agglutinant (55) may slightly exhibit color. In addition, even after the decolorized state has once been reached, there may be cases where agglutinant (55) will be in a state of slightly exhibiting color. In such case, although not completely colorless, in comparison to the state of being colored exhibited during transferring of agglutinant (55), or in other words during application of the material for application, this will be in a state that is rather close to being colorless. Such cases are matters that of course can be envisaged.

Furthermore, agglutinant (55), prior to being accommodated in light-shielding case (2) as a part of tape accommodating portion (5), due to being irradiated by ultraviolet light of a certain intensity having a wavelength of 365 nm for a certain length of time, is brought in advance to a state of exhibiting color. In other words, the irradiating step of the manufacturing method of an application product according to the present invention is a step where ultraviolet light is irradiated onto agglutinant (55) in advance to tape accommodating portion (5) being accommodated into light-shielding case (2) to be in a state as illustrated in FIG. 7.

Next, the operation as well as the functions upon transferring of transferring tool (1) according to the present embodiment will be described in reference to the same drawing.

When this transferring tool (1) is used, agglutinant (55) irradiated in advance with ultraviolet light and maintained in a state of exhibiting color is applied, or in other words transferred onto the subject. Subsequently, although agglutinant (55) in a state of exhibiting color retains this state of exhibiting color for a while after being transferred, the color gradually fades due to passage of time and eventually reaches a decolorized state. This occurs because, due to the diarylethene-based photochromic compound which has formed a ring-closed body contained in agglutinant (55) being irradiated with the visible light of the light of natural conditions, the reaction of transitioning into a ring-opened body which is an isomer thereof proceeds and is then completed.

With the configuration as described in the above, with transferring tool (1), which is an application product according to the present embodiment, as it is easy to confirm where agglutinant (55) has been applied during application due to the color being exhibited by the diarylethene-based photochromic compound itself, it is further easier to visually recognize unapplied areas, and as agglutinant (55) enters a decolorized state when brought under light of natural conditions, it is also possible for traces of application of agglutinant (55) to be unnoticeable.

Furthermore, in the present embodiment, as the configuration is such that said photochromic compound is added by 0.005-5.0 wt %, preferably 0.05-3.0 wt %, or further preferably 0.1-1.0 wt % in relation to the subject of the additive to which said photochromic compound is added, the color due to the photochromic compound is further reflected onto the state of the material for application exhibiting color.

In the present embodiment, in order to effectively maintain a balance between having clear colors in the state of exhibiting color and having the performance of being capable of securely fastening the subject to another object, the subject of the additive which is the subject to which the said photochromic compound is added is an acrylic agglutinant.

Fourth Embodiment

Figure 8:
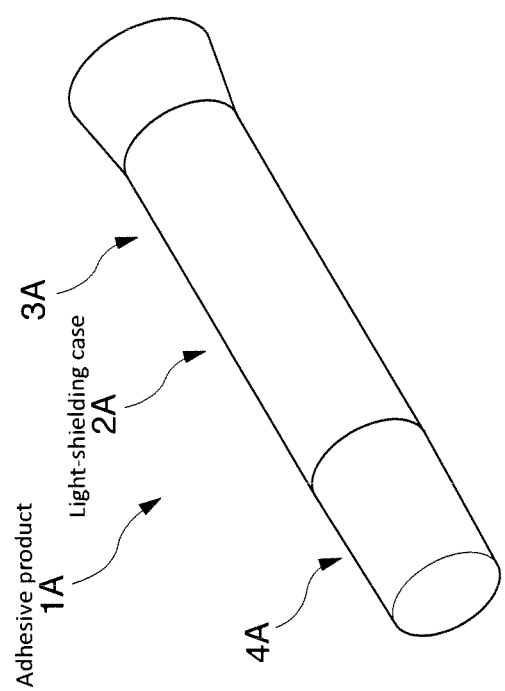
FIG. 8 is an exterior view of a fourth embodiment according to the present invention.

Adhesive product (1A) which is an application product according to a fourth embodiment of the present invention will be explained below while referring to FIG. 8 and FIG. 9. In said embodiment, components that are equivalent to the components of the embodiments described earlier will be referred to using the same numbers yet with an "A" added, and the detailed explanations thereof will be appropriately omitted. In other words, components that are equivalent to the components of the second embodiment described earlier will be referred to using the same numbers.

Adhesive product (1A) which is an application product according to the present embodiment is what is commonly referred to as an "instantaneous adhesive" and is mainly configured of a cyanoacrylate mixed together with a photochromic compound added by 0.005-5.0 wt %, preferably 0.05-3.0 wt %, or further preferably 0.1-1.0 wt % in relation to the weight of the subject of the additive.

This adhesive product (1A), similar to the embodiment described earlier, is characterized by comprising adhesive (55A) which is a material for application, containing a photochromic compound that exhibits color when an ultraviolet light which is a certain wavelength light having a certain wavelength is irradiated thereon and becomes colorless when a light of natural conditions is irradiated thereon, that enters a state of exhibiting color when the ultraviolet light is irradiated thereon and enters a decolorized state when a light of natural conditions is irradiated thereon, and light-shielding case (2A) which is a container in which adhesive (55A) prepared in advance to be in a state of exhibiting color is accommodated.

This adhesive product (1A) specifically has light-shielding case (2A) and packing container (5A) wherein adhesive (55A) is encapsulated in an encapsulating body (56A) formed of a resin having flexibility.

Light-shielding case (2A) is at least configured to be capable of shielding the light of visible light and for example may be made of a synthetic resin or an aluminum tube. In addition, light-shielding case (2A) specifically has a main body case (3A) which is capable of accommodating adhesive (55A), and cap (4A) which is capable of serving as a lid for this main body case (3A).

Packing container (5A) is configured such that adhesive (55A) prepared in advance to be in a state of exhibiting color is encapsulated in encapsulating body (56A) which is for example formed of a resin that has flexibility while also having light-shielding properties to the same extent as the abovementioned light-shielding case (2A).

Encapsulating body (56A) encapsulates adhesive (55A) when unused, and during use, it is capable of applying adhesive (55A) by a hole that is bored at the distal end thereof with such as a needle not illustrated. After the hole has been bored, adhesive (55A) is discharged from the hole for example by being tilted or by being pressed with fingers, etc. during use and is applied to a subject. Furthermore, although the present embodiment is separately provided with, apart from encapsulating body (56A), a needle-shaped body which is capable of boring a hole in the distal end of encapsulating body (56A) and plugging said hole, as this needle-shaped body appropriately utilizes an existing configuration, the illustration and explanation of said needle-shaped body will be omitted in the present embodiment.

Adhesive (55A), as described in the above, is mainly configured of a cyanoacrylate mixed together with a photochromic compound similar to that of the first embodiment described earlier for example added by 0.1-1.0 wt % in relation to the subject of the additive.

Figure 9:
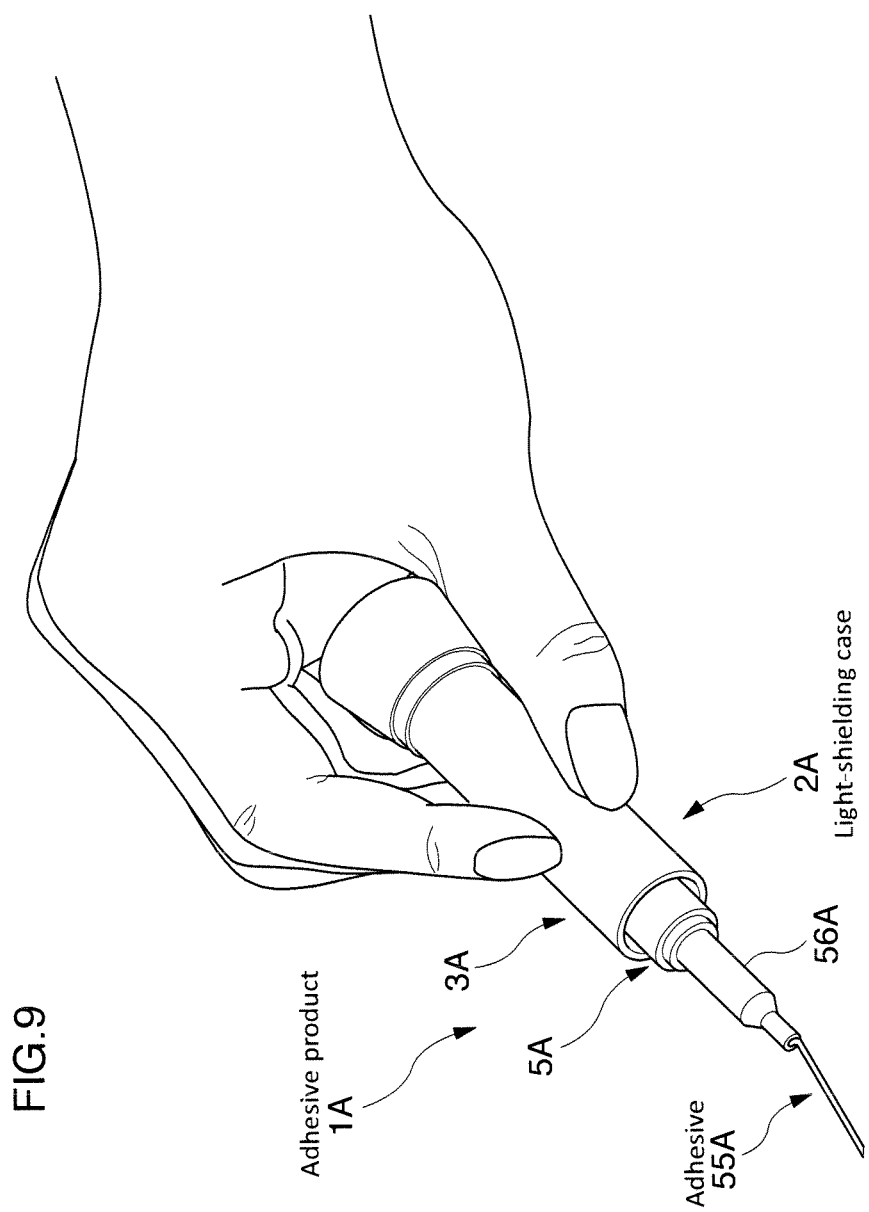
FIG. 9 is an explanatory drawing of operation pertaining to the same embodiment.

Furthermore, as illustrated in FIG. 9, when using this adhesive product (1A), first cap (4A) is removed from main body case (3A), and subsequently adhesive (55A) is applied. Due to this, as adhesive (55A) that is to be applied enters a state of exhibiting color in advance, adhesive (55A) becomes suitably visible to the user. In addition, in a similar manner to the embodiment described earlier, this adhesive (55A) eventually reaches a decolorized state due to passage of time. Again, in a similar manner to the embodiment described earlier, this occurs because, due to the diarylethene-based photochromic compound which has formed a ring-closed body contained in adhesive (55A) being irradiated with the visible light of the light of natural conditions, the reaction of transitioning into a ring-opened body which is an isomer thereof proceeds.

With such configuration, as an application product of the present invention, even with adhesive product (1A) capable of applying a liquid adhesive (55A), in a similar manner to the first embodiment described earlier, as it is easy to confirm where adhesive (55A) has been applied due to the color being exhibited by the photochromic compound itself, it is further easier to visually recognize unapplied areas, and as adhesive product (1A) enters a decolorized state when brought under light of natural conditions, it is also possible for traces of application of adhesive (55A) to be unnoticeable.

Fifth Embodiment

Figure 10:
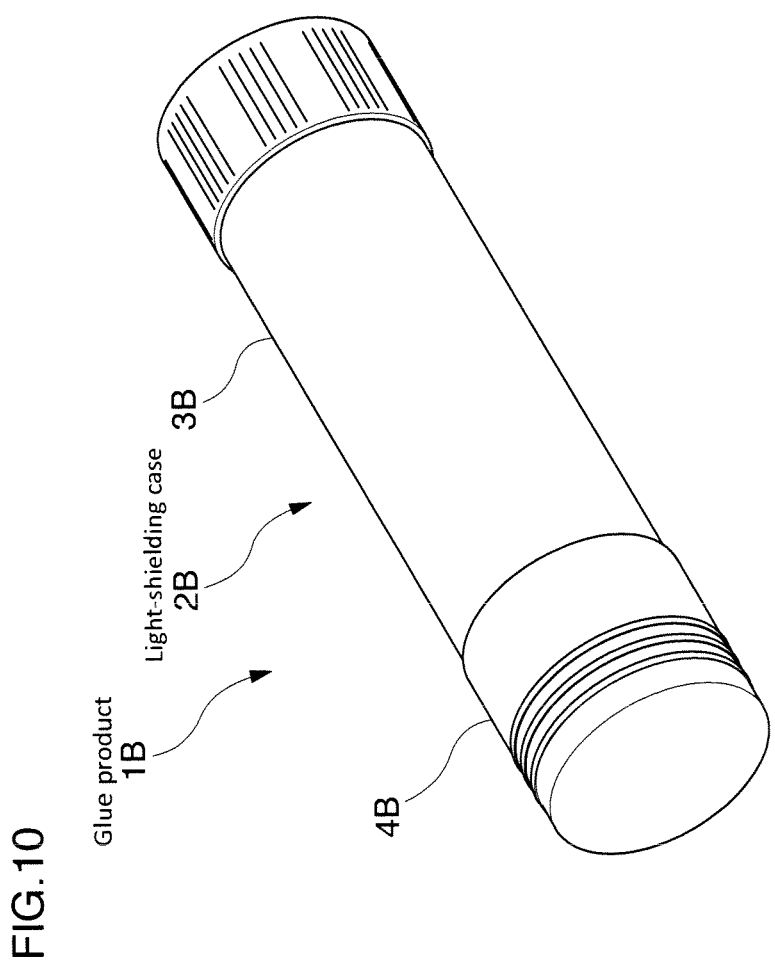
FIG. 10 is an exterior view of a fifth embodiment according to the present invention.
Figure 11:
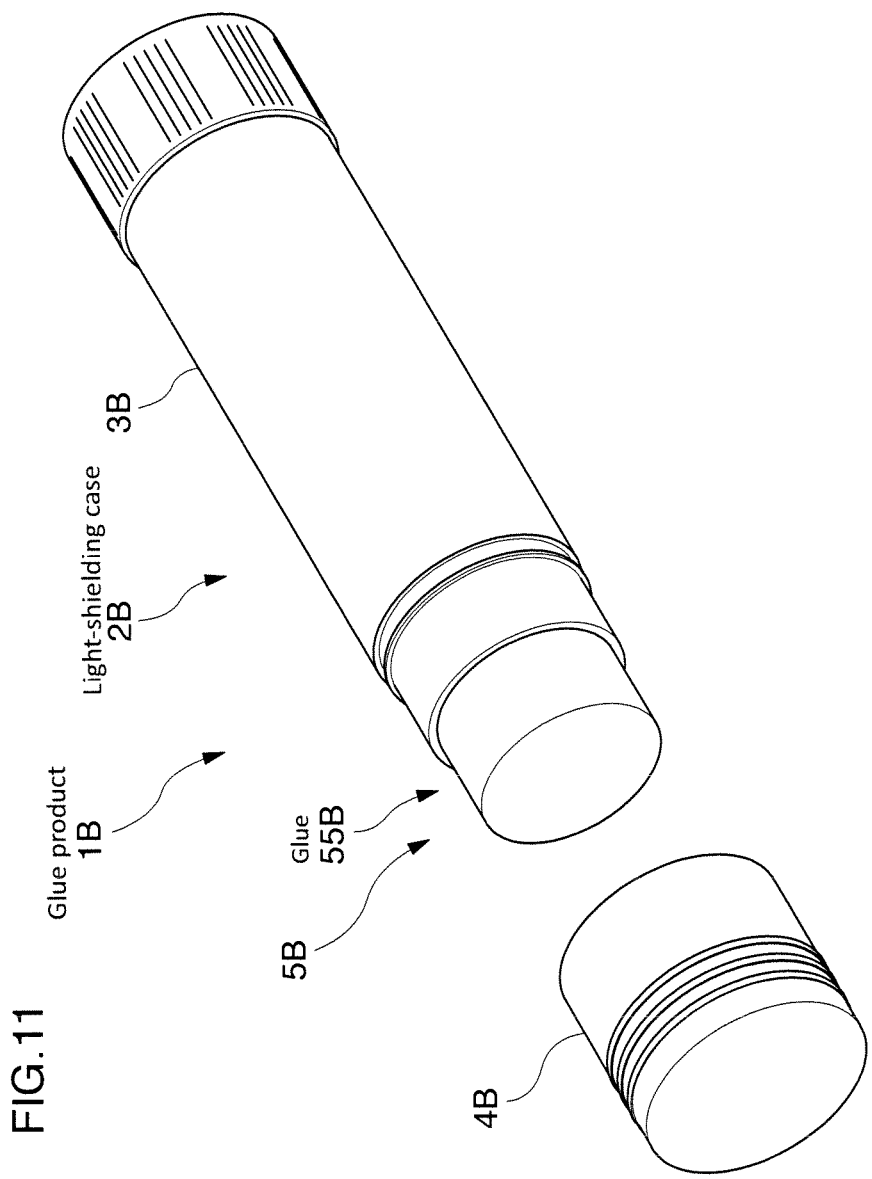
FIG. 11 is an explanatory drawing of configuration pertaining to the same embodiment.

Glue product (1B) which is an application product according to a fifth embodiment of the present invention will be explained below while referring to FIG. 10 through FIG. 12. In said embodiment, components that are equivalent to the components of the embodiments described earlier will be referred to using the same numbers yet with a "B" added, and the detailed explanations thereof will be appropriately omitted.

Glue product (1B) which is an application product according to the present embodiment is what is commonly referred to as a "glue stick" and is configured of a photochromic compound for example added by 0.005-5.0 wt %, preferably 0.05-3.0 wt %, or further preferably 0.1-1.0 wt % in relation to the weight of the subject of the additive capable of forming a solid.

This glue product (1B), similar to the embodiment described earlier, is characterized by comprising glue (55B) which is a material for application, containing a photochromic compound that exhibits color when an ultraviolet light which is a certain wavelength light having a certain wavelength is irradiated thereon and becomes colorless when a light of natural conditions is irradiated thereon, that enters a state of exhibiting color when the ultraviolet light is irradiated thereon and enters a decolorized state when a light of natural conditions is irradiated thereon, and light-shielding case (2B) which is a container in which glue (55B) prepared in advance to be in a state of exhibiting color is accommodated.

This glue product (1B) specifically has light-shielding case (2B) and block (5B) configured of glue (55B) hardened to form a stick and shaped to be cylindrical.

Light-shielding case (2B) is at least configured to be capable of shielding the light of visible light and for example is made of a synthetic resin. In addition, light-shielding case (2B) specifically has a main body case (3B) which is capable of accommodating glue (55B), and cap (4B) which is capable of serving as a lid for this main body case (3B). In addition, although this light-shielding case (2B) has for example a configuration that makes it possible to project block (5B) in the lengthwise direction by rotating the base end of main body case (3B), as it is possible for an existing configuration to be applied for the configuration of such, the detailed explanation thereof will be omitted.

Block (5B), by being configured of glue (55B) hardened to be cylindrical and having the base end portion thereof fixed to case main body (3B), is capable of operating in such manner that makes it possible to operate for block (5B) to be projected from case main body (3B).

Glue (55B), as described in the above, is configured of a photochromic compound similar to that of the first embodiment described earlier added by 0.005-5.0 wt %, preferably 0.05-3.0 wt %, or further preferably 0.1-1.0 wt % in relation to the subject of the additive capable of configuring a solid glue. Furthermore, the material for application according to the present embodiment, or in other words glue (55B), in addition to the photochromic compound described in the above, contains an ultraviolet absorbent. Due to this configuration, in cases when a light of natural conditions is irradiated thereon, as the ultraviolet light contained in that light is absorbed by the ultraviolet absorbent, it becomes further easier for the visible light to function in relation to the photochromic compound to quickly turn the compound into the decolorized state.

Figure 12:
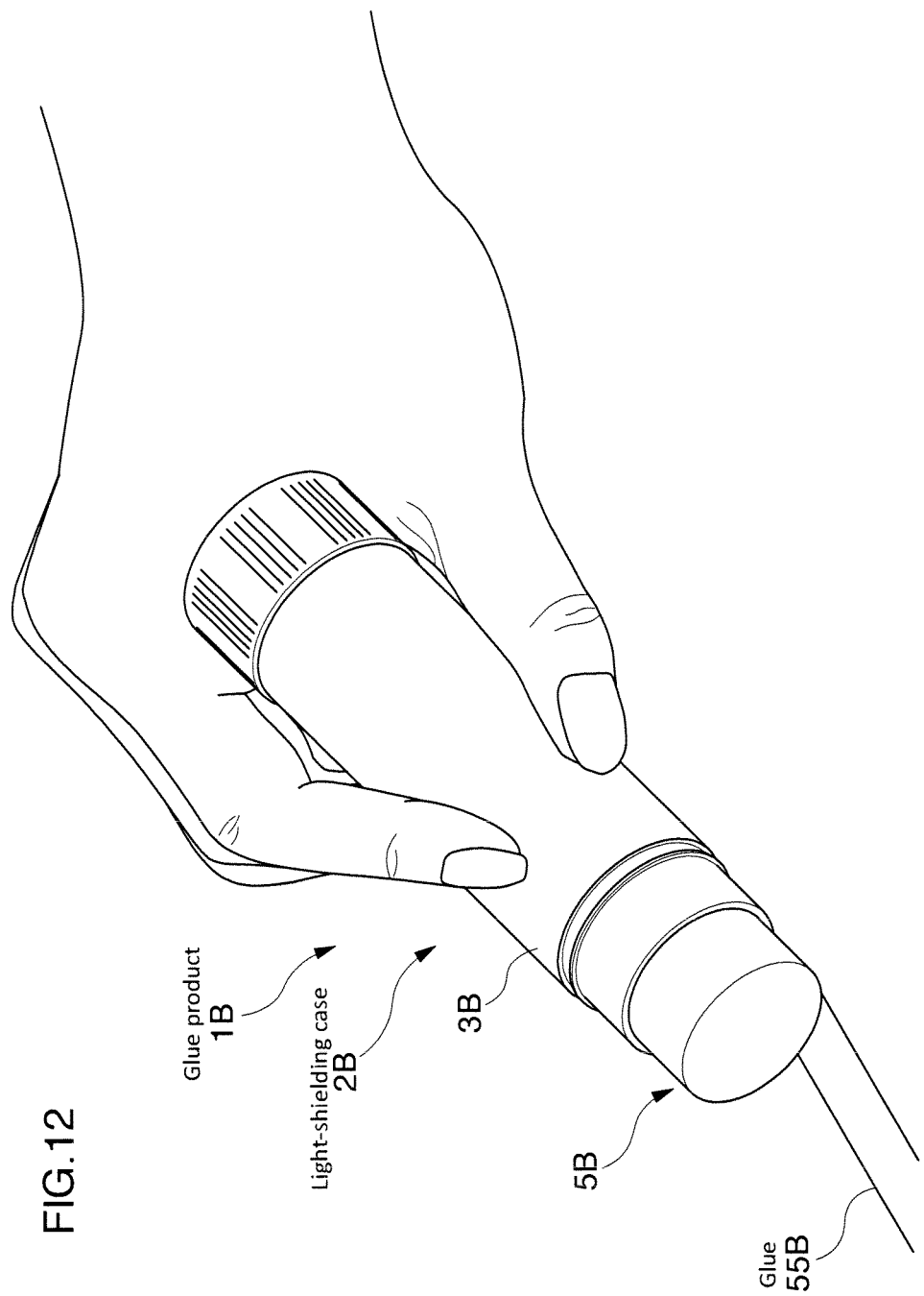
FIG. 12 is an explanatory drawing of operation of the same.

Furthermore, as illustrated in FIG. 12, when using this glue product (1B), first cap (4B) is removed from main body case (3B), and subsequently glue (55B) is applied. Due to this, as glue (55B) that is to be applied enters a state of exhibiting color in advance, glue (55B) becomes suitably visible to the user. In addition, in a similar manner to the embodiment described earlier, this glue (55B) eventually reaches a decolorized state due to passage of time. Again, in a similar manner to the embodiment described earlier, this occurs because, due to the diarylethene-based photochromic compound which has formed a ring-closed body contained in glue (55B) being irradiated with the visible light of the light of natural conditions, the reaction of transitioning into a ring-opened body which is an isomer thereof proceeds.

With such configuration, as an application product of the present invention, even with glue product (1B) capable of applying a solid glue (55B), in a similar manner to the first embodiment described earlier, as it is easy to confirm where glue (55B) has been applied due to the color being exhibited by the photochromic compound itself, it is further easier to visually recognize unapplied areas, and as glue product (1B) enters a decolorized state when brought under light of natural conditions, it is also possible for traces of application of glue (55B) to be unnoticeable.

Although embodiments of the present invention have been described in the above, the specific configurations of each part are not limited to only the embodiments that have been described in the above, and it is possible to apply various modifications in a range that does not deviate from the purpose of the present invention.

For example, although modes of application products such as a transferring tool and an adhesive have been disclosed in each of the embodiments described earlier, of course an application product according to the present invention is not limited to these embodiments described earlier. In addition, it is possible to have a configuration wherein the application product uses a material for application of a so-called multi-purpose adhesive such as a urethane-based adhesive or a rubber-based adhesive solvent, etc., an adhesive for wood such as a vinyl acetate resin-based emulsion, etc., or a water-based adhesive such as liquid glue, etc. Furthermore for example, it is possible for a configuration where ink is used as the material for application and the application product is capable of being used as a writing material, or a configuration where grease is used as the material for application and the application product is used as a so-called spray grease capable of spraying this grease, etc. to suitably configure an application product of the present invention as long as the product is one that applies a material onto a subject. In addition, it is possible for the photochromic compound capable of being utilized with the present invention to be a photochromic compound that is spiropyran-based, spirooxazine-based, fulgides-based, cyclophane-based, or azobenzene-based or other compounds, as long as the compound exhibits color when an ultraviolet light having a certain wavelength is irradiated thereon and becomes colorless when a light of natural conditions is irradiated thereon. In addition, the specific modes of each part, such as the shape of the transferring tool or the configuration of the irradiation unit, are not limited to those of the embodiments that have been described in the above, and it is possible to apply various modes including those that are preexistent.

Additionally, the specific configurations of each part are not limited to those of the embodiments that have been described in the above, and it is possible to apply various modifications in a range that does not deviate from the purpose of the present invention.

PRACTICAL EXAMPLES

Although practical examples of the present invention will be explained below in detail, the present invention is not limited to these practical examples.

Practical Example 1

For the present practical example, as shown in FIG. 13, in order to realize agglutinant (55) disclosed in the first embodiment described earlier, Practical Examples 1-1 through 1-23 were created and the color of each was studied. In the studies of the color, the subjects were rated with the 6 grades of grade 1 (sufficiently rather bold color), grade 2 (sufficient color), grade 3 (color can be visibly interpreted), grade 4 (color is slightly weak), grade 5 (color is weak), and grade 6 (almost no color).
<Testing Method>
As shown in the same drawing, these embodiments, as the subject of the additive, utilize an acrylic emulsion capable of being used alone as a agglutinant, and each has been added with 1,2-Bis(2-methylbenzo(b)thiophen-3-yl)hexafluorocyclopentene (hereinafter referred to as the compound) which is the diarylethene-based photochromic compound applied in each of the embodiments described earlier, by each diarylethene concentration shown. The compound, upon being added, was either dissolved into various solvents or directly dispersed, and was then mixed and stirred with the subject of the additive for each of the specified amount of time using either a mixer or a magnetic stirrer. Subsequently, this was applied to a polyethylene terephthalate (PET) film having a thickness of 19 μm and having both sides treated with a process to enable separation, where this was then thermally dried under each of the specified conditions of temperature and time. It should be noted that the steps up to here correspond to the material for application creating step.

Subsequently after such, the thickness of the agglutinant (glue thickness) was measured. Then after this, as what corresponds to the irradiating step, a UV lamp was sufficiently irradiated for the subjects to be in a state of exhibiting color. However, for convenience in the process of rating the degree of color, the irradiation of the UV lamp, in the present practical example, was not directed at the pressure-sensitive transfer-type tape, and instead consisted of transferring the agglutinant onto copying paper (manufactured by KOKUYO S&T Co., Ltd., product number: KB-39N), and then using AS ONE Handy Lamp SLUV-4, ultraviolet light having a wavelength of 365 nm was irradiated for a certain amount of time with an output of 9.0 W, 0.15 A. Subsequently in regard to Practical Examples 1-1 through 1-11, the degree of the disappearance of color (checking for color disappearance) upon irradiation of a visible light onto the agglutinant in a state of exhibiting color was studied. Specifically, in relation to said Practical Examples 1-1 through 1-11 transferred onto copying paper and in a state of exhibiting color, an identical copying paper was further laminated on top where this was then left on a desk under a fluorescent light within a certain office. In this state of being left on the desk, the degree of color was confirmed from above and the times until the color completely disappeared were recorded for each.
<Test Results: Practical Examples 1-1 Through 1-11>
In regard to Practical Examples 1-1 through 1-11, tests were conducted in regard to the differences in color due to the differences in the concentration of diarylethene. Accordingly, results indicated that the higher that the concentration of diarylethene is, the more intense the color exhibited is. Especially with Practical Example 1-3 wherein diarylethene has been added by 0.05 wt % in relation to the subject of the additive, it was possible to achieve color that can be visibly interpreted for a rating of grade 5. In addition, as indicated by how the degree of color exhibited by Practical Examples 1-10 and 1-11 are both of an identical degree of a rating of grade 1, it can be considered that even when diarylethene is added by 5 wt % or more, there is no greater effect on the color that is exhibited.

In addition, in regard to the degree of the disappearance of color of these Practical Examples 1-1 through 1-11, decolorizing could be confirmed almost immediately with Practical Examples 1-1 through 1-3 wherein the compound was added with a diarylethene concentration of 0.05 wt % or less. Meanwhile, in each of the Practical Examples added with a diarylethene concentration of 0.1 wt % or more, there was a tendency where the time until the color disappeared increased proportionately to the diarylethene concentration. Furthermore, with Practical Example 1-11 added with the greatest diarylethene concentration of 10.0 wt %, disappearing of color was confirmed after 39 minutes.
<Test Results: Practical Examples 1-12 Through 1-17>
In regard to Practical Examples 1-12 through 1-17, tests were conducted in regard to the differences in color due to the differences in the type of solvent and the amount of time that the compound and the solvent are stirred for. Accordingly, results indicated that all practical examples achieved a rating of grade 3 identical to Practical Example 1-7 wherein the compound is added by 0.5 wt %. From these results, it could be determined that regardless of whether or not a solvent is contained, or the type of solvent in cases when a solvent is contained, it is possible for the diarylethene to effectively exhibit color as long as such is sufficiently stirred.

<Test Results: Practical Examples 1-18, 1-19>

In regard to Practical Examples 1-18 through 1-19, tests were conducted in regard to the differences in color due to the differences in the amount of the solvent used to dissolve the compound, namely acetone. Accordingly, results indicated that although the amount of acetone was increased in comparison to Practical Example 1-4, a difference in the exhibited color could not be seen with any of the practical examples.

<Test Results: Practical Examples 1-20 Through 1-23>

In regard to Practical Examples 1-20 through 1-23, tests were conducted in regard to the differences in color due to the differences in the amount of the solvent used to dissolve the compound, namely acetone, and the amount of time that such is stirred for in the subject of the additive. As a result, an effect in the color exhibited could not be seen with any in comparison to Practical Example 1-7.

<Test Results: Practical Examples 1-24 Through 1-26>

In regard to Practical Examples 1-24 through 1-26, tests were conducted in regard to the differences in color due to the differences in the amount of drying time after application of the agglutinant and the drying temperature during such. As a result, an effect in the color exhibited could not be seen with any in comparison to Practical Example 1-7.

<Test Results: Practical Examples 1-27 Through 1-29>

In regard to Practical Examples 1-27 through 1-29, tests were conducted in regard to the differences in color due to the differences in the dimension of the thickness of the agglutinant (glue thickness). Accordingly, results indicated that stronger colors are exhibited proportionately to the thickness of the agglutinant. It was made evident that increasing amount of the compound proportionately to the thickness is affected. Moreover, it was made evident that due to the irradiation of the UV lamp described earlier, color is exhibited from not only the surface of the agglutinant that has been applied, but from everywhere in the entire region across the thickness.

From the test results shown in the above, it was made evident that the factor which affects the color the most is the concentration of diarylethene, and the factor that affects the color next is the dimension of the thickness of the agglutinant (glue thickness). While Practical Example 1-2 was added with the smallest diarylethene concentration of 0.01 wt % that managed to exhibit color, from the results of Practical Example 1-10 and 1-11 that indicate that when the concentration of diarylethene is 5.0 wt % or more, more time is required for decolorizing although there is no drastic change in the exhibited color, it can be considered that a diarylethene concentration that is capable of being suitably applied to an application product according to the first embodiment described earlier is 0.01-5.0 wt %, and a concentration of 0.1-1.0 wt % which is equivalent to that of Practical Examples 1-4 through 1-8 is further preferable for a decent balance between the exhibited color and decolorizing.

Practical Example 2

For the present practical example, as shown in FIG. 14, in order to realize adhesive (55A) disclosed in the second embodiment described earlier, Practical Examples 2-1 through 2-12 were created and the color of each was studied. In the studies of the color, the subjects were rated with the 6 grades of grade 1 (sufficiently rather bold color), grade 2 (sufficient color), grade 3 (color can be visibly interpreted), grade 4 (color is slightly weak), grade 5 (color is weak), and grade 6 (almost no color).

<Testing Method>

As shown in the same drawing, these embodiments, as the subject of the additive, utilize a cyanoacrylate monomer to which an additive has not been added (pure monomer) capable of being used alone as an instantaneous adhesive, as well as Aron Alpha (registered trademark), Aron Alpha (registered trademark) for Professionals (high-speed) (manufactured by Konishi Co., Ltd.), Aron Alpha (registered trademark) for Professionals (impact-resistant) (manufactured by Konishi Co., Ltd.), and Aron Alpha (registered trademark) Jellified (manufactured by Konishi Co., Ltd.) which are commercially available products, and each has been added with the compound applied in each of the embodiments described earlier, by each concentration shown. The compound, upon being added, was directly dispersed without utilizing a solvent, and was then mixed and stirred within a polypropylene cup of a capacity of 5 ml for each of the specified amount of time. It should be noted that the steps up to here correspond to the material for application creating step.

Subsequently after such, as what corresponds to the irradiating step, a UV lamp was sufficiently irradiated. This UV lamp irradiation consisted of utilizing AS ONE Handy Lamp SLUV-4 and performing irradiation with an ultraviolet light having a wavelength of 365 nm for a certain amount of time and from a certain distance with an output of 9.0 W, 0.15 A.

<Test Results: Practical Examples 2-1 Through 2-4>

In regard to Practical Examples 2-1 through 2-4, tests were conducted in regard to the differences of the subject of the additive. Accordingly, results indicated that sufficient color of a rating of grade 2 could be achieved with any of the practical examples. This means that effective application, in relation to the compound concerned or an existing compound utilized as an instantaneous adhesive, is possible without utilizing a solvent.

<Test Results: Practical Examples 2-5 Through 2-16>

In regard to Practical Examples 2-5 through 2-16, tests were conducted in regard to the differences in color due to the differences in the concentration of diarylethene. Accordingly, results indicated that the higher that the concentration of compound is, the more intense the color exhibited is. Especially, in regard to the concentration of diarylethene and the color, color was slightly exhibited even with Practical Example 2-5 added by 0.005 wt %, and as evident from the results of Practical Example 2-15 and Practical Example 2-16, with a diarylethene concentration of 5.0 wt % or more, color is exhibited sufficiently enough that a change cannot be seen. From these test results, it was made evident that when considering application to the second embodiment described earlier, Practical Examples 2-8 through 2-13 which exhibit color of a rating of grade 2-4 are preferable, or in other words it is desirable that the concentration of diarylethene is 0.1-1.0 wt %.

<Test Results: Practical Examples 2-17 Through 2-19>

In regard to Practical Examples 2-17 through 2-19, tests were conducted in regard to the differences in color due to the differences in the stirring method used and the amount of stirring time applied upon dissolving the compound. Accordingly, results indicated that all practical examples achieved sufficient color similar to Practical Example 2-1. In other words, effects could be not be seen in regard to the differences in color due to the differences in the stirring method used and the amount of stirring time applied upon dissolving the compound.

<Test Results: Practical Examples 2-20 Through 2-21>

In regard to Practical Examples 2-20 through 2-21, tests were conducted in regard to the differences in color due to the differences in the irradiation distance from the surface of the adhesive, or in other words the separated distance, and the irradiation time during irradiation of the UV light in the irradiating step. As a result, although with Practical Example 2-21, wherein the irradiation distance was doubled and the irradiation time was reduced to half, it was possible to achieve color that can be visibly interpreted for a rating of grade 2.5, this fell short of the rating of grade 2 of Practical Example 2-20.

Practical Example 3

For the present practical example, as shown in FIG. 15, in order to realize agglutinant (55) disclosed in the first embodiment described earlier, Practical Examples 3-1 through 3-9 were created along with Comparative Example 3-1, and after being prepared to exhibit color similar to with Practical Example 1 described earlier and completely being decolorized by exposure to visible light, each was studied for whether or not recoloring would occur upon being placed outdoors where ultraviolet light is especially intense. In the studies of the color, the subjects were rated with the 6 grades of grade 1 (sufficiently rather bold color), grade 2 (sufficient color), grade 3 (color can be visibly interpreted), grade 4 (color is slightly weak), grade 5 (color is weak), and grade 6 (almost no color). As the ultraviolet absorbent utilized in the present practical example, "SEESORB 101 (2-Hydroxy-4-methoxybenzophenone)", "SEESORB 102 (2-Hydroxy-4-n-octyloxybenzophenone)" and "SEESORB 701 (2-(2-Hydroxy-5-methylphenyl)benzotriazole)" which are products manufactured by SHIPRO KASEI KAISHA, LTD. were used.

<Testing Method>

As shown in the same drawing, these embodiments utilize, as the subject of the additive, an acrylic emulsion capable of being used alone as a agglutinant, and each has been added with 1,2-Bis(2-methylbenzo(b)thiophen-3-yl)hexafluorocyclopentene (hereinafter referred to as the compound) which is the diarylethene-based photochromic compound applied in each of the embodiments described earlier by 1.0 wt % in addition to 3 types of ultraviolet absorbents that have each been added by 0.1, 0.5, and 1.0 wt % to create Practical Examples 3-1 through 3-9. Additionally, along with these, Comparative Example 3-1 which does not have an ultraviolet absorbent added thereto was also created. The ultraviolet absorbents were added by first being manually stirred in 0.1 ml of acetone for 30 seconds with an eyedropper, where then each was stirred in relation to the agglutinant for 1 minute by utilizing a mixer. Subsequently, this was applied with a thickness of 20-25 μm onto a polyethylene terephthalate (PET) film having a thickness of 19 μm and having both sides treated with a process to enable separation, where this was then thermally dried under a temperature of 150° C. for 2 minutes. It should be noted that the steps up to here correspond to the material for application creating step.

<Test Results: Comparative Example 3-1, Practical Examples 3-1 Through 3-9>

In regard to Comparative Example 3-1 which did not have an ultraviolet absorbent added thereto, recoloring of rating of grade 4.5 could be confirmed outdoors where ultraviolet light was especially intense. On the other hand, recoloring of a rating of more than grade 4.5 did not occur with each of the practical examples, and the effects due to the ultraviolent absorbents were confirmed. Especially in regard to Practical Examples 3-3, 3-6, and 3-9, which had been mixed with an ultraviolet absorbent by 1.0 wt %, especially desirable effects, where almost no recoloring occurs, were confirmed.

Practical Example 4

For the present practical example, as shown in FIG. 16, in order to realize adhesive (55A) disclosed in the second embodiment described earlier, Comparative Example 4-1 and Practical Examples 4-1 through 4-9 were created, and after being prepared to exhibit color similar to with Practical Example 3 described earlier and completely being decolorized by exposure to visible light, each was studied for whether or not recoloring would occur upon being placed outdoors where ultraviolet light is especially intense. In the studies of the color similar to Practical Example 1, the subjects were rated with the 6 grades of grade 1 (sufficiently rather bold color), grade 2 (sufficient color), grade 3 (color can be visibly interpreted), grade 4 (color is slightly weak), grade 5 (color is weak), and grade 6 (almost no color).

<Testing Method>

As shown in the same drawing, in these embodiments, a cyanoacrylate monomer to which an additive has not been added (pure monomer), capable of being used alone as an instantaneous adhesive, is utilized as the subject of the additive, and each has been added with the compound applied in each of the embodiments described earlier as well as an ultraviolet absorbent by each concentration shown. The compound, upon being added, was directly dispersed without utilizing a solvent, and was then mixed and stirred within a polypropylene cup of a capacity of 5 ml for each of the specified amount of time. It should be noted that the steps up to here correspond to the material for application creating step.

Subsequently after such, as what corresponds to the irradiating step, a UV lamp was sufficiently irradiated. This UV lamp irradiation consisted of utilizing AS ONE Handy Lamp SLUV-4 and performing irradiation with an ultraviolet light having a wavelength of 365 nm for a certain amount of time and from a certain distance with an output of 9.0 W, 0.15 A. Subsequently, in the present practical example, after the comparative example prepared to exhibit color and the practical examples prepared to exhibit color in a similar manner to with Practical Example 3 described earlier are completely decolorized by exposure to visible light, each was studied for whether or not recoloring would occur upon being placed outdoors where ultraviolet light is especially intense.

<Test Results: Comparative Example 4-1, Practical Examples 4-1 Through 4-9>

In regard to Comparative Example 4-1 which did not have any ultraviolet absorbents added thereto, recoloring of a rating of grade 4 could be confirmed outdoors where ultraviolet light was especially intense. On the other hand, recoloring of a rating of more than grade 4.5 did not occur with each of the practical examples, and the effects due to the ultraviolent absorbents were confirmed. Especially in regard to Practical Examples 4-3, 4-6, and 4-9, which had been mixed with an ultraviolet absorbent by 1.0 wt %, especially desirable effects, where almost no recoloring occurs, were confirmed.

INDUSTRIAL APPLICABILITY

The present invention is capable of being utilized as an application product for applying a material for application such as glue or an adhesive, etc. onto a subject.

EXPLANATION OF REFERENCE NUMERALS

1 Application product (Transferring tool)
1A Application product (Adhesive product)
1B Application product (Glue product)
2 Container, Light-shielding container, Case for transferring tool (Case, Light-shielding case)
2A Container, Light-shielding container (Case, Light-shielding case)
2B Light-shielding container (Light-shielding case)
34, 34A Irradiation means, Irradiation unit (Irradiation unit)
53 Transfer head
54 Pressure-sensitive transfer-type tape
55 Material for application, Agglutinant for transferring tool (Agglutinant)
55A Material for application (Adhesive)
55B Material for application (Glue)
56 Base
56a Rear surface
X, XA Passage region

The invention claimed is:

1. An application product comprising: a material for application containing a diarylethene-based photochromic compound, the material exhibiting color when irradiated with an ultraviolet light having a certain wavelength, the material in a state of exhibiting color becoming decolorized when irradiated with a visible light, the material in the state of exhibiting color also becoming decolorized when irradiated with sunlight; and a light-shielding container in which the material for application in the state of exhibiting color is accommodated, the light-shielding container shielding the material from a visible light so that the material is in the state of exhibiting color when it is applied to a subject.

2. An application product according to claim 1, wherein said photochromic compound is a photochromic compound that exhibits color when an ultraviolet light having a certain wavelength is irradiated thereon and becomes colorless when a visible light is irradiated thereon.

3. An application product according to claim 1, wherein said photochromic compound is a photochromic compound that becomes colorless when a light of natural conditions is irradiated thereon.

4. An application product according to claim 1, wherein said material for application is a material for application having said photochromic compound added by 0.005-5.0 wt %.

5. An application product according to claim 1, wherein the material for application is a material for application mixed with an ultraviolet absorbent.

6. An application product according to claim 1, provided with an irradiation unit which is attached to said container and is capable of and turning said material for application to be in the state of exhibiting color by irradiating said certain wavelength light toward said material for application prior to application when said material for application is applied onto a subject.

7. An application product according to claim 6, wherein said irradiation unit is an irradiation unit which irradiates said certain wavelength light towards a passage region through which said material for application passes upon being applied onto a subject.

8. An application product according to claim 6, wherein said irradiation unit is attached within said container.

9. An application product according to claim 6, which is an application product utilized as a transferring tool, wherein: said material for application is a agglutinant for the transferring tool and configures, in a state of being applied to a film-shaped base in a separable manner, a pressure-sensitive transfer-type tape; said container is a case for the transferring tool which accommodates said pressure-sensitive transfer-type tape; and said irradiation unit is attached to said case for the transferring tool.

10. An application product according to claim 9, wherein said irradiation unit is an irradiation unit which irradiates said certain wavelength light towards a passage region through which said material for application passes upon being applied onto a subject, wherein said irradiation unit irradiates said passage region near a transfer head that supports said base upon said agglutinant being pressed and transferred to said subject.

11. An application product according to claim 10, wherein said base is a base configured such that it is possible for said certain wavelength light to pass through, and said irradiation unit irradiates said certain wavelength light from the side of the rear surface of said base.

12. An application product according to claim 10, wherein said irradiation unit is an irradiation unit configured such that it is capable of irradiating said certain wavelength light in accordance with the action of said transfer head being pressed onto said subject.

13. An application product according to claim 1, wherein said material for application is an adhesive in the form of a liquid.

14. An application product according to claim 13, wherein said adhesive is an adhesive which contains cyanoacrylate.

15. An application product according to claim 1, wherein said material for application is a glue in the form of a solid.

16. An application product according to claim 1, wherein the material for application is grease capable of spraying.

* * * * *